(12) United States Patent
Rugel et al.

(10) Patent No.: US 11,574,357 B1
(45) Date of Patent: Feb. 7, 2023

(54) ONBOARDING PLATFORM FOR PERFORMING DYNAMIC MITIGATION ANALYSIS

(71) Applicant: Allstate Insurance Company, Northbrook, IL (US)

(72) Inventors: John Rugel, Hawthorn Woods, IL (US); Howard Hayes, Glencoe, IL (US); Surender Kumar, Palatine, IL (US); Matthew Olenak, Chicago, IL (US); Avani Patel, Chicago, IL (US); Araba Appiagyei-Dankah, Chicago, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 384 days.

(21) Appl. No.: 16/238,050

(22) Filed: Jan. 2, 2019

(51) Int. Cl.
*G06Q 30/06* (2012.01)
*G06F 21/40* (2013.01)
*G06F 21/32* (2013.01)

(52) U.S. Cl.
CPC ......... *G06Q 30/0641* (2013.01); *G06F 21/32* (2013.01); *G06F 21/40* (2013.01)

(58) Field of Classification Search
CPC ..... G06Q 10/00–30; G06Q 20/00–425; G06Q 30/00–08; G06F 21/00–88; H04N 7/00–56; H04L 9/00–38
See application file for complete search history.

(56) References Cited

U.S. PATENT DOCUMENTS

| 6,871,287 | B1 | 3/2005 | Ellingson |
| 7,278,025 | B2 | 10/2007 | Saito et al. |
| 7,548,886 | B2 | 6/2009 | Kirkland et al. |
| 7,686,214 | B1 | 3/2010 | Shao et al. |
| 8,103,543 | B1 | 1/2012 | Zwicky |

(Continued)

FOREIGN PATENT DOCUMENTS

CN 107133438 A 9/2017

OTHER PUBLICATIONS

Jan. 26, 2020—(US) Non-Final Office Action—U.S. Appl. No. 16/238,021.

(Continued)

*Primary Examiner* — John W Hayes
*Assistant Examiner* — Chenyuh Kuo
(74) *Attorney, Agent, or Firm* — Polsinelli PC

(57) ABSTRACT

Aspects of the disclosure relate to computing platforms that utilize improved mitigation analysis and policy management techniques to improve onboarding security. A computing platform may determine that a predetermined period of time has elapsed since finalizing an onboarding process. The computing platform may receive spot check verification inputs indicative of a user identity and may direct a mitigation analysis and output generation platform to analyze the spot check verification inputs. The computing platform may receive an indication of a correlation between the spot check verification inputs and expected spot check verification inputs. In response to determining that the correlation exceeds a predetermined threshold, the computing platform may determine that an additional verification test should be conducted, and may direct the mobile device to display an interface that prompts for additional onboarding verification inputs.

20 Claims, 17 Drawing Sheets

(56) References Cited

U.S. PATENT DOCUMENTS

| | | | |
|---|---|---|---|
| 8,185,747 | B2 | 5/2012 | Wood et al. |
| 8,401,878 | B2 | 3/2013 | Stender et al. |
| 8,984,606 | B2* | 3/2015 | Kamat ............... H04L 63/20 726/7 |
| 9,119,539 | B1* | 9/2015 | Dotan ............... A61B 5/02438 |
| 9,147,117 | B1 | 9/2015 | Madhu et al. |
| 9,391,986 | B2* | 7/2016 | Schultz ............ H04W 12/0605 |
| 9,697,660 | B1 | 7/2017 | Sokolov et al. |
| 9,794,260 | B2 | 10/2017 | Loughlin-McHugh et al. |
| 10,432,892 | B1* | 10/2019 | Tamayo ............... G06Q 40/08 |
| 10,581,612 | B2* | 3/2020 | Landrock ............ G06F 21/602 |
| 10,812,479 | B2* | 10/2020 | Apturkar ............ H04L 9/3231 |
| 2003/0112120 | A1 | 6/2003 | K. |
| 2005/0283388 | A1 | 12/2005 | Eberwine et al. |
| 2006/0136595 | A1 | 6/2006 | Satyavolu |
| 2009/0182583 | A1* | 7/2009 | Harkensee ............ G06Q 40/08 705/4 |
| 2009/0182585 | A1* | 7/2009 | Harkensee ........... G06Q 20/105 705/4 |
| 2013/0055367 | A1* | 2/2013 | Kshirsagar ............ G06F 21/32 726/6 |
| 2013/0090950 | A1* | 4/2013 | Rao ................... G06Q 30/0613 705/4 |
| 2013/0204645 | A1* | 8/2013 | Lehman ............... G06Q 20/322 705/4 |
| 2013/0226623 | A1* | 8/2013 | Diana .................. G06Q 10/10 705/4 |
| 2013/0332286 | A1 | 12/2013 | Medelius et al. |
| 2014/0018686 | A1 | 1/2014 | Medelius et al. |
| 2014/0041017 | A1* | 2/2014 | Wentworth ............ H04L 63/08 726/17 |
| 2015/0178581 | A1* | 6/2015 | Aoki ..................... G06V 40/50 382/115 |
| 2016/0155126 | A1 | 6/2016 | D'Uva |
| 2017/0011195 | A1 | 1/2017 | Arshad et al. |
| 2018/0315127 | A1* | 11/2018 | Chappell ............... G06Q 40/08 |
| 2019/0079782 | A1* | 3/2019 | Goldberg ............... G06F 9/54 |
| 2019/0141039 | A1* | 5/2019 | Stoops ................. H04W 12/06 |
| 2019/0312879 | A1 | 10/2019 | Agrawal et al. |
| 2019/0313367 | A1 | 10/2019 | Ryu et al. |
| 2020/0089848 | A1 | 3/2020 | Abdelaziz et al. |

OTHER PUBLICATIONS

"Shufti Pro" https://shuftipro.com/technology/ website visited Sep. 5, 2018 pp. 1-9.

"When Identity Matters" https://www.jumio.com/ website visited Sep. 5, 2018 pp. 1-12.

"Document Authentication & Identity Verification Software" https://www.acuantcorp.com/products/assureid-identity-verification-software/ website visited Sep. 5, 2018 pp. 1-10.

"Provide a seamless online experience" https://www.idscan.com/solutions/digital-onboarding/ website visited Sep. 5, 2018 pp. 1-5.

Garrett Gafke "Fraud Prevention Best Practices for On-boarding New Customers" https://payment-and-card.cioreview.com/cxoinsight/fraud-prevention-best-practices-for-onboarding-new-customers-nid-14133-cid-171.html website visited Sep. 5, 2018 pp. 1-7.

"Fueling Growth, Profitability and Security" https://www.threatmetrix.com/cyber-security-solutions/insurance/ website visited Sep. 5, 2018 pp. 1-8.

"How Can AI in the Insurance Industry Help With Fraud Detection and Claims Management" https://www.marutitech.com/ai-in-the-insurance-industry/ website visited Sep. 5, 2018 pp. 1-12.

Ruchi Verma et al. "Using Analyytics for Insurance Fraud Detection" https://www.the-digital-insurer.com/wp-content/uploads/2013/12/53-insurance-fraud-detection.pdf website visited Jan. 2, 2019 pp. 1-10.

"Combat Fraud and Protect Your Bottom Line" Safetech Fraud and Security Solutions PCNP-066 0311 Chase Paymentech Solutions, LLC 2011 pp. 1-6.

"Prevent application fraud and improve customer experience across all channels" Experian https://www.experian.co.uk/identity-and-fraud/fraud-prevention/hunter.html website visited Sep. 5, 2018 pp. 1-5.

"Current fraud trends in the financial sector" Assocham India https://www.pwc.in/assets/pdfs/publications/2015/current-fraud-trends-in-the-financial-sector.pdf Jun. 2015 pp. 1-28.

Jun. 21, 2021—(US) Final Office Action—U.S. Appl. No. 16/238,021.

Clark, Lisa. Stakeholders: Bullet List of Legal Considerations. Mondaq Business Briefing. May 29, 2012 (Year: 2012).

\* cited by examiner

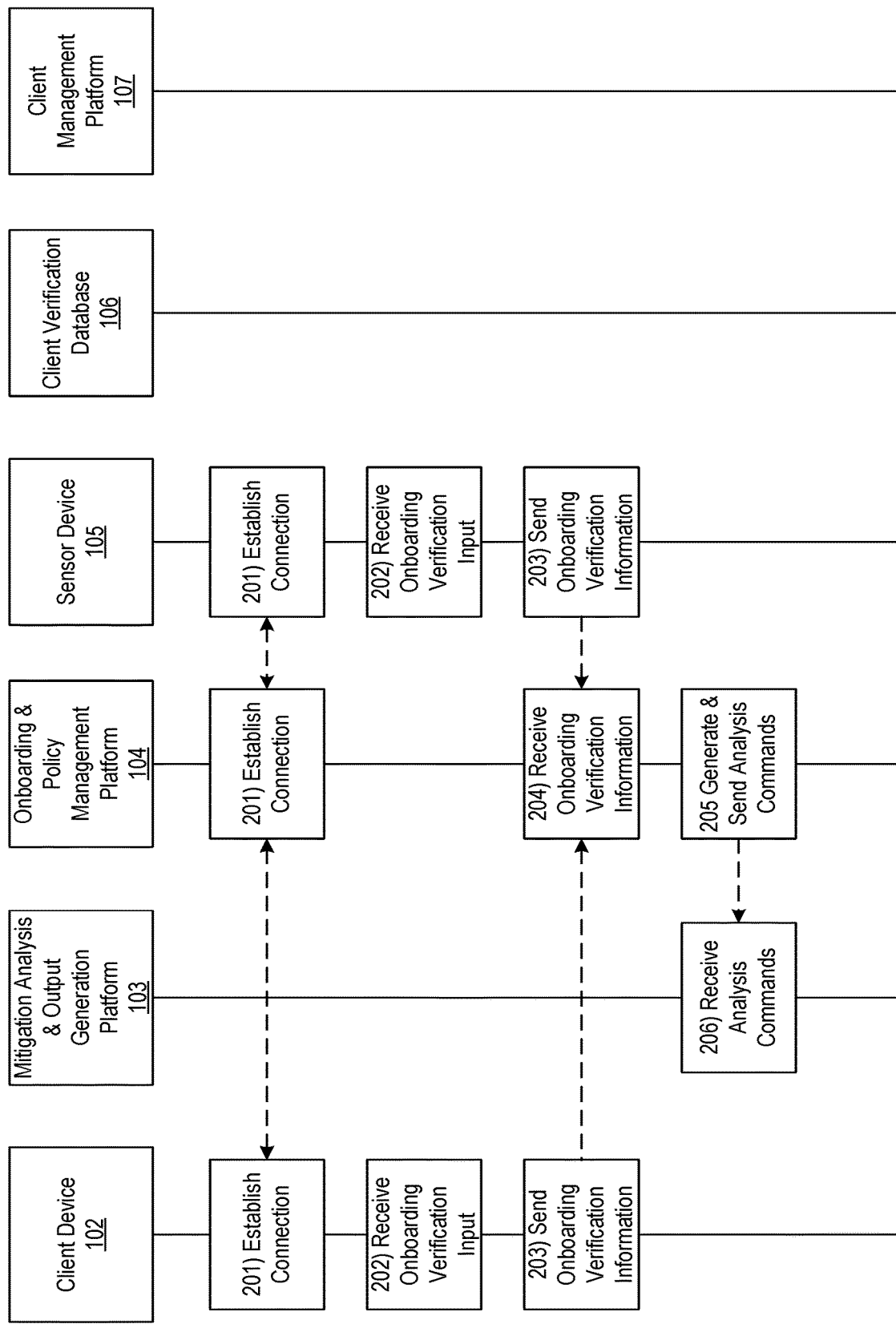

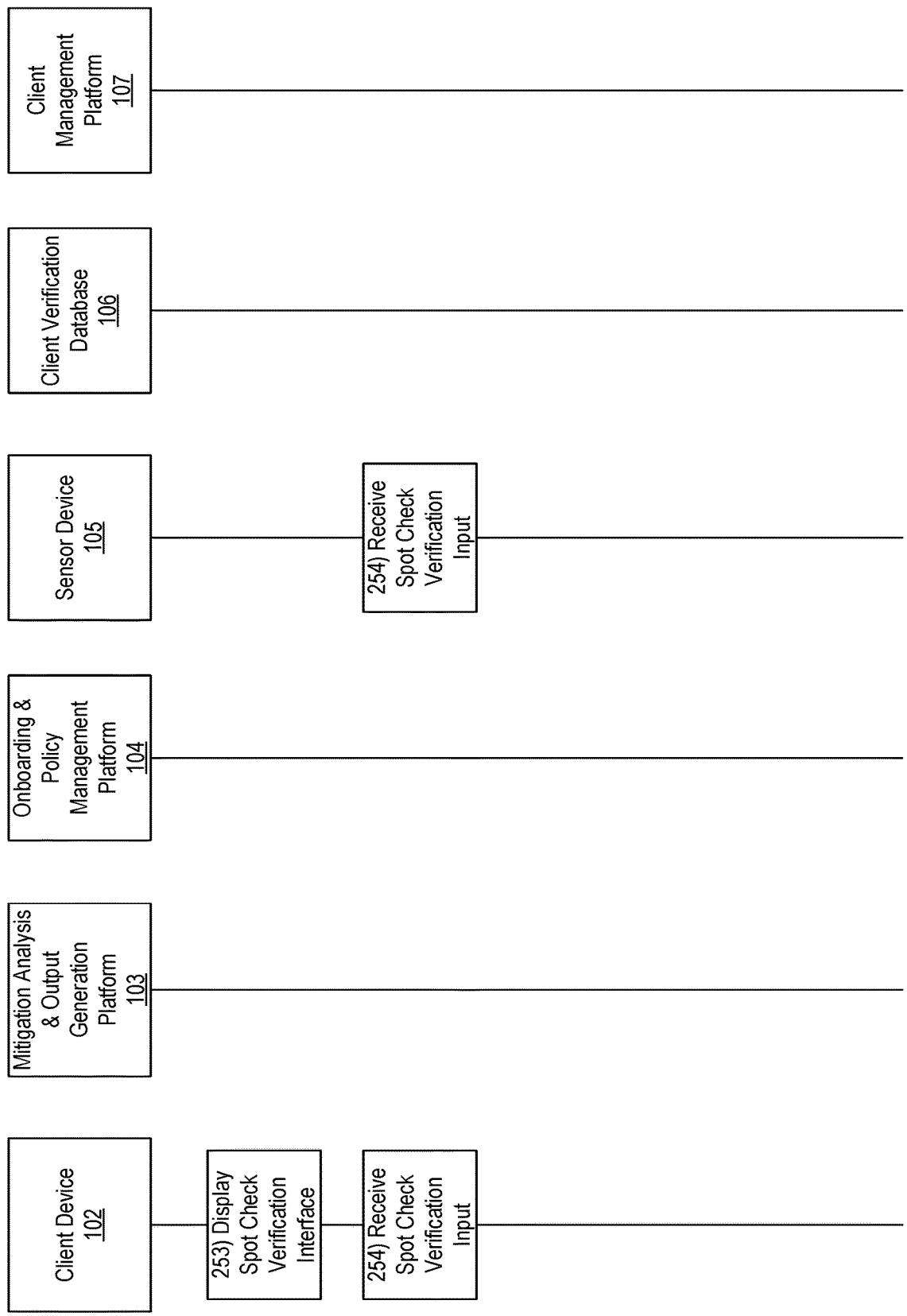

505

Client Onboarding Interface

Welcome to Onboarding!

Please capture a photo of yourself for identity verification.

Onboarding Management Interface

ALERT: Client failed onboarding verification test.

Client Interface

Hello! It has been 90 days since you completed onboarding.

Please select "Accept" below to initiate a spot check identity test.

Accept

Onboarding Management Interface

ALERT: Client failed spot check identity verification test. Please select next steps.

Additional Test    Terminate Policy

ONBOARDING PLATFORM FOR PERFORMING DYNAMIC MITIGATION ANALYSIS

BACKGROUND

Aspects of the disclosure relate to enhanced processing systems for providing mitigation and spot check verification outputs using improved methods for analysis of one or more client verification inputs. Many organizations and individuals rely on an onboarding process for purchasing products. In many instances, however, a user identity may be falsified during the onboarding process. There remains an ever-present need to develop alternative solutions to improve client verification during and after the onboarding process.

SUMMARY

Aspects of the disclosure provide effective, efficient, scalable, and convenient technical solutions that address and overcome the technical problems associated with client verification during and after an onboarding process. In accordance with one or more arrangements discussed herein, a computing platform having at least one processor, a communication interface, and memory may determine that a predetermined period of time has elapsed since finalizing an onboarding process. In response to determining that the predetermined period of time has elapsed since finalizing the onboarding process, the computing platform may send a spot check verification notification and one or more commands to display the spot check verification notification. The computing platform may receive, from the mobile device, one or more spot check verification inputs indicative of a user identity. The computing platform may send one or more commands directing a mitigation analysis and output generation platform to analyze the one or more spot check verification inputs. The computing platform may receive, from the mitigation analysis and output generation platform, a spot check verification output indicating a degree of correlation between the one or more received spot check verification inputs and expected spot check verification inputs. In response to determining that the spot check verification output exceeds a predetermined mitigation threshold, the computing platform may send one or more commands directing a client management platform to display a mitigation notification interface, where the mitigation notification interface prompts for user input to void purchase of a product corresponding to the onboarding process or conduct an additional verification test. In response to determining that the additional verification test should be conducted, the computing platform may send mitigation interface information and one or more commands directing the mobile device to display a spot check mitigation interface based on the mitigation interface information, where the spot check mitigation interface prompts for one or more additional spot check verification inputs indicative of the user identity.

In some arrangements, the computing platform may determine an amount of time elapsed during the onboarding process. In response to determining that a correlation between the amount of time elapsed during the onboarding process and an expected onboarding process time does not exceed a predetermined onboarding time correlation threshold, the computing platform may void purchase of the product corresponding to the onboarding process.

In some examples, the onboarding process may correspond to a process for purchasing the product and wherein the product corresponds to a particular product type. In some arrangements, the computing platform may determine the particular product type. The computing platform may determine the expected onboarding process time based on the particular product type.

In some arrangements, the one or more spot check verification inputs may correspond to one or more onboarding verification inputs received during the onboarding process. In some arrangements, the one or more spot check verification inputs may correspond to one or more of a pulse, a voice signature, a retinal/iris scan, a motion signature, a fingerprint, a code response, global positioning system (GPS) data, a photograph, air sensor data, ambient noise data, a heart rate, acceleration data, and a pressure change.

In some arrangements, the one or more spot check verification inputs may be received while a video conference session is established between the mobile device and the client management platform. In some arrangements, prior to sending the spot check verification notification and one or more commands to display the spot check verification notification, the computing platform may determine that a verified digital identity signature was received. In some arrangements, the one or more commands directing the mitigation analysis and output generation platform to analyze the one or more spot check verification inputs may direct the mitigation analysis and output generation platform to compare the one or more spot check verification inputs to verification information from a client verification database.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for deploying computing platforms that utilize improved mitigation analysis and policy management techniques in accordance with one or more example arrangements discussed herein;

FIGS. 5-8 depict illustrative user interfaces for computing platforms that utilize improved mitigation analysis and policy management techniques in accordance with one or more example arrangements discussed herein.

DETAILED DESCRIPTION

Figure 1A:
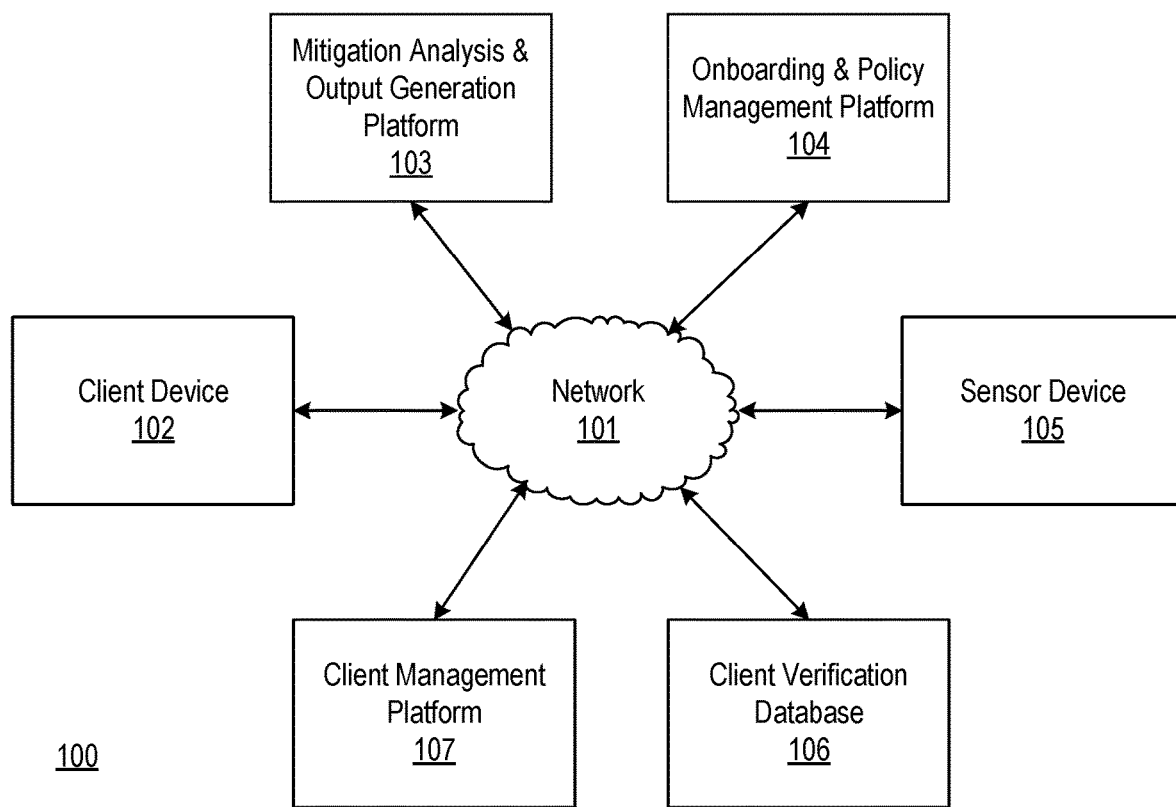
FIGS. 1A-1C depict an illustrative computing environment for deploying computing platforms that utilize improved mitigation analysis and policy management techniques in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief summary, the present disclosure provides systems and methods for increasing security associated with an onboarding purchasing process. In a particular example, a system may detect potential fraud in the process of an individual signing up for life insurance using their mobile phone or other computer device. To do so, the system may collect information using the mobile phone or other device. This information may be compared to past databases or fraud indicators. If the system detects a potential fraud situation, the system may prevent the user from obtaining the life insurance through an automated process and may prompt for additional actions such as an in-person interview with the individual. The system may also provide a potential fraud score based on analysis of several items of potential fraud analysis. When the score goes above a certain level, the system may prompt for additional processes, such as additional verifications of the individual.

In one or more instances, the system may use one or more sensors on a mobile phone or other device to detect two different types of personal information from an individual. For example, a phone may capture both an image of a person and the person's pulse. Sensors that may be used may include cameras, voice recorders, or the like.

In one or more instances, the system may determine an amount of time that an individual takes to complete an on-boarding process for life insurance and the complexity of the insurance product purchased. A system may then compare the time for onboarding to pre-set values for fraud detection. If the on-boarding time falls below or above a preset value for a particular type of insurance, then the system may raise a fraud alert and prompt for additional processing for the individual to obtain life (or other types of) insurance.

In one or more instances, the system may engage in a spot-check of a period of time after an individual has obtained life insurance. The system may contact the user at a time that is a surprise to the user (such as through a phone call). The system may prompt the user to provide validating information on the spot. This validating information may include the user's pulse, voice signature, motion signature (e.g., walking, running, or the like), fingerprint, or a response to a ping (a code) from the system. If the validating information does not match expected information, then the system may prompt the individual to engage in additional processes or cancels the insurance policy.

In one or more instances, the system may use virtual assistance in the onboarding process to mitigate fraud. The system may have the user engage in a visual process with a virtual assistant (e.g., a video conference call, or the like). The system may prompt the user to move the phone in certain angles and the remote system may take photos of the user or the background during the visual discussion. The system may then analyze the information against fraud detectors. If the system determines that fraud factors are above a certain level, the system may prompt for additional processing.

In one or more instances, the system may analyze a user's identifying information during a contestability period. The system may determine if the identifying information falls within certain fraud detection parameters and if so, the system may prompt for additional fraud mitigation steps such as an in-person interview or cancellation of the policy. As one example, the system may determine if the identifying information during the contestability period matches the identifying information during the on-boarding process. Information that may be obtained and analyzed during the contestability period may include GPS data, photos, air sensor data, ambient noise data, heart rate data, accelerometer data, pressure change data, movement signatures, health information, or the like.

These and various other arrangements will be described more fully herein.

Figure 1B:
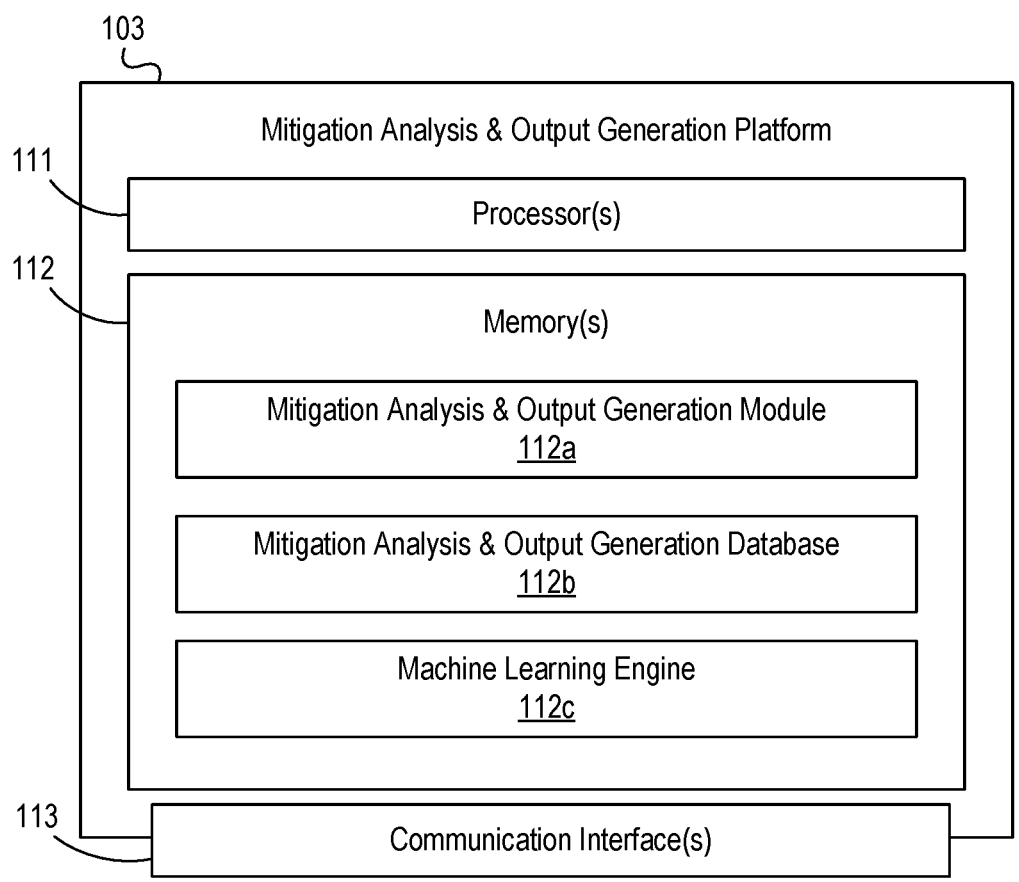
Figure 1C:
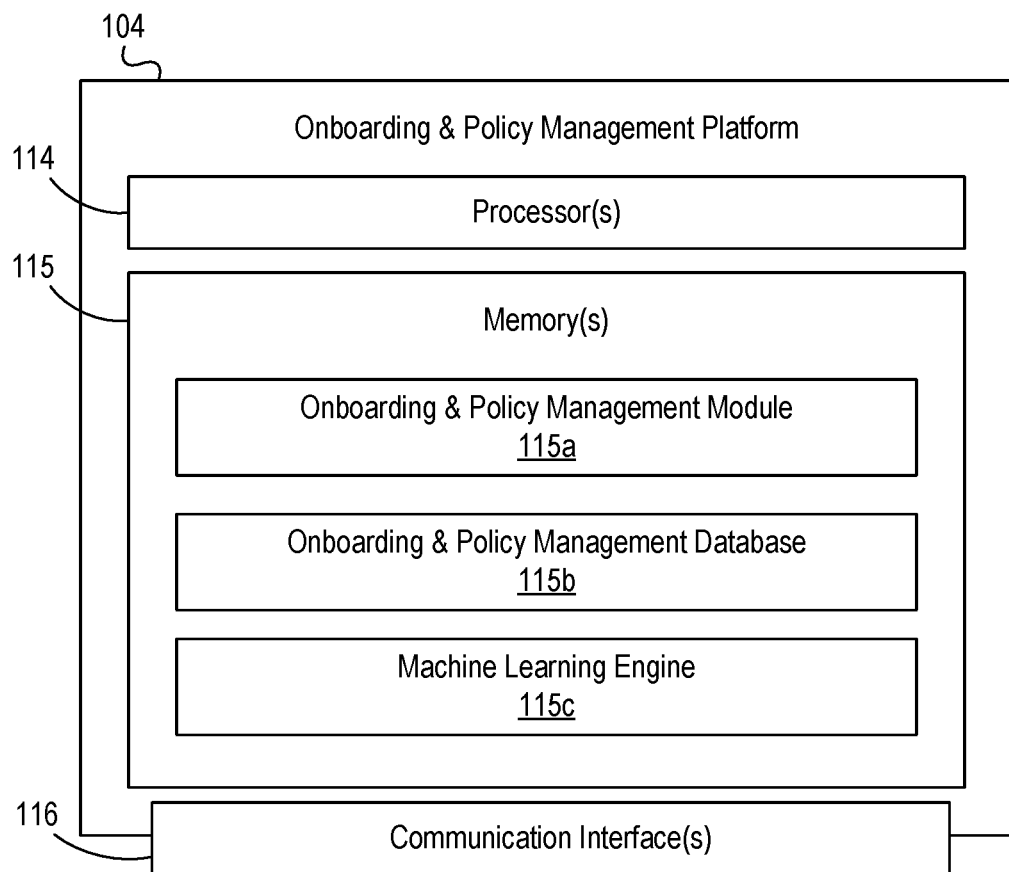

FIGS. 1A-1C depict an illustrative computing environment for deploying an onboarding policy and management platform that causes performance of advanced mitigation analysis techniques in accordance with one or more example embodiments. Referring to FIG. 1A, computing environment 100 may include one or more computer systems. For example, computing environment 100 may include client device 102, mitigation analysis and output generation platform 103, onboarding policy and management platform 104, sensor device 105, client verification database 106, and client management platform 107.

Client device 102 may be a personal computing device (e.g., smartphone, laptop computer, desktop computer, tablet computer, or the like) that is capable of receiving commands and generating user interfaces accordingly. In addition, client device 102 may include one or more cameras and/or sensors (e.g., motion sensors, global positioning sensors, temperature sensors, microphones or the like) that may be used to capture data corresponding to a user. In some instances, the client device 102 may be configured to send this data upon request or at predetermined intervals for analysis.

As illustrated in greater detail below, mitigation analysis and output generation platform 103 may include one or more computing devices configured to perform one or more of the functions described herein. For example, mitigation analysis and output generation platform may include one or more computers (e.g., laptop computers, desktop computers, servers, server blades, or the like). In one or more instances, mitigation analysis output generation platform 103 may be configured to receive data captured by the client device 102 and/or sensor device 105 and analyze the data to determine mitigation outputs. In one or more instances, the mitigation analysis and output generation platform 103 may have access to data stored at the client verification database 106, and may compare the data from the client device 102/sensor device 105 to the data stored at the client verification database 106 to determine the mitigation outputs.

As illustrated in greater detail below, the onboarding policy and management platform 104 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by onboarding policy and management platform 104 may be associated with an external portal provided by an organization, such as an onboarding portal provided by an insurance institution or provider that may allow customers to purchase insurance products. Although FIG. 1A depicts mitigation analysis and output generation platform 103 and onboarding policy and management platform 104 as two distinct computing devices, it should be understood that in some instances, mitigation analysis and output generation platform 103 and onboarding policy and management 104 may be implemented in a single computing platform.

Sensor device 105 may be a computing device configured to collect and send data for further analysis. In some instances, sensor device 105 may be a fitness tracker or other wearable device, a smart watch, a microphone, a heart rate monitor, an accelerometer, a pressure sensor, a movement sensor, other health sensor, or the like. It should be understood that in some instances, the sensor 105 may be embedded in the client device 102.

Client verification database 106 may be a computing platform capable of storing and maintaining various information corresponding to one or more clients. For example, the client verification database 106 may contain activity data, health data, gait pattern biometrics data (e.g., data identifying individuals based on their walking patterns, or the like), a voice signature, a facial signature, an iris scan, a security question and response/code, a date of birth, a social security number, a home address, movement data, photographs, or the like corresponding to the clients. In one or more instances, the client verification database 106 may be configured to receive requests for the information corresponding to a particular client, identify the information corresponding to the particular client, and send the information for the particular client. In one or more instances, the client verification database 106 may be an internal database associated with an institution (e.g., an insurance institution). In other instances, the client verification database 106 may be an external database associated with a third party (e.g., a social media database, or the like).

Client management platform 107 may be a computing device (e.g., a desktop computer, laptop computer, tablet computer, smart phone, or the like) that may be used to receive mitigation notifications and display user interfaces accordingly. For example, the client management platform 107 may be used by an employee of an insurance institution to determine a potential security threat associated with purchase of a particular insurance product. Accordingly, the client management platform 107 may receive user input from the employee indicating whether the purchase should be voided or whether additional client verification tests should be performed.

Computing environment 100 also may include one or more networks, which may interconnect one or more of client device 102, mitigation analysis and output generation platform 103, onboarding and policy management platform 104, sensor device 105, client verification database 106, and client management platform 107. For example, computing environment 100 may include a network 101 (which may, e.g., interconnect dynamic client device 102, mitigation analysis and output generation platform 103, onboarding and policy management platform 104, sensor device 105, client verification database 106, and client management platform 107).

In one or more arrangements, client device 102, mitigation analysis and output generation platform 103, onboarding and policy management platform 104, sensor device 105, client verification database 106, client management platform 107, and/or the other systems included in computing environment 100 may be any type of computing device capable of receiving a user interface, receiving input using the user interface, and communicating the received input to one or more other computing devices. For example, client device 102, mitigation analysis and output generation platform 103, onboarding and policy management platform 104, sensor device 105, client verification database 106, client management platform 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 102, mitigation analysis and output generation platform 103, onboarding and policy management platform 104, sensor device 105, client verification database 106, and client management platform 107 may, in some instances, be special-purpose computing devices configured to perform specific functions.

Referring to FIG. 1B, mitigation analysis and output generation platform 103 may include one or more processors 111, memory 112, and communication interface 113. A data bus may interconnect processor 111, memory 112, and communication interface 113. Communication interface 113 may be a network interface configured to support communication between mitigation analysis and output generation platform 103 and one or more networks (e.g., network 101, or the like). Memory 112 may include one or more program modules having instructions that when executed by processor 111 cause mitigation analysis and output generation platform 103 to perform one or more functions described herein and/or one or more databases that may store and/or otherwise maintain information which may be used by such program modules and/or processor 111. In some instances, the one or more program modules and/or databases may be stored by and/or maintained in different memory units of mitigation analysis and output generation platform 103 and/or by different computing devices that may form and/or otherwise make up mitigation analysis and output generation platform 103. For example, memory 112 may have, store, and/or include a mitigation analysis and output generation module 112a, a mitigation analysis and output generation database 112b, and a machine learning engine 112c. Mitigation analysis and output generation module 112a may have instructions that direct and/or cause mitigation analysis and output generation platform 103 to execute advanced computer vision methods for analyzing onboarding and spot check verification inputs and generating mitigation outputs, as discussed in greater detail below. Mitigation analysis and output generation module 112b may store information used by mitigation analysis and output generation module 112a and/or mitigation analysis and output generation platform 103 in onboarding and spot check verification input analysis, mitigation output generation, and/or in performing other functions. Machine learning engine 112c may have instructions that direct and/or cause the mitigation analysis and output generation platform 103 to perform onboarding and spot check verification analysis and to set, define, and/or iteratively refine optimization rules and/or other parameters used by the mitigation analysis and output generation platform 103 and/or other systems in computing environment 100.

Referring to FIG. 1C, onboarding and policy management platform 104 may include one or more processors 114, memory 115, and communication interface 116. A data bus may interconnect processor 114, memory 115, and communication interface 116. Communication interface 116 may be a network interface configured to support communication between onboarding and policy management platform 104 and one or more networks (e.g., network 101, or the like). Memory 115 may include one or more program modules having instructions that when executed by processor 114 cause onboarding and policy management platform 104 to perform one or more functions described herein and/or one or more databases that may store and/or otherwise maintain information which may be used by such program modules and/or processor 114. In some instances, the one or more program modules and/or databases may be stored by and/or maintained in different memory units of onboarding and policy management platform 104 and/or by different computing devices that may form and/or otherwise make up onboarding and policy management platform 104. For example, memory 115 may have, store, and/or include an onboarding and policy management module 115a, an onboarding and policy management database 115b, and a machine learning engine 115c. Onboarding and policy management module 115a may have instructions that direct and/or cause onboarding and policy management platform 104 to execute onboarding and policy management methods for analyzing an onboarding process and determining whether satisfactory client identification has been performed, as discussed in greater detail below. Onboarding and policy management database 115b may store information used by onboarding and policy management module 115a and/or onboarding and policy management platform 104 in onboarding analysis and/or in performing other functions. Machine learning engine 115c may have instructions that direct and/or cause the onboarding and policy management platform 104 to perform onboarding and policy management, and to set, define, and/or iteratively refine optimization rules, algorithms, and/or other parameters used by the onboarding and policy management platform 104 and/or other systems in computing environment 100.

FIGS. 2A-2J depict an illustrative event sequence for deploying a mitigation analysis and output generation platform 103 and an onboarding and policy management platform 104 that utilize advanced methods and techniques to perform fraud analysis during and after an onboarding purchasing process to perform client identity verification and mitigate security threats in accordance with one or more example embodiments.

Referring to FIG. 2A, at step 201, the client device 102 and the sensor device 105 may establish connections with the onboarding and policy management platform 104. In one or more instances, the client device 102 and the sensor device 105 may establish first and second wireless data connections to the onboarding and policy management platform 104 to link the client device 102 and the sensor device 105, respectively, to the onboarding and policy management platform 104.

At step 202, the client device 102 and/or the sensor device 105 may display a client onboarding interface and may receive onboarding verification inputs. For example, a client may be interested in purchasing one or more products through an external portal provided by an institution (e.g., insurance products provided by an insurance institution). Additionally or alternatively, the client device 102 may establish a video call session with the client management platform 107. In one or more instances, the client device 102 and/or the sensor device may display the client onboarding interface for the purpose of allowing a client to purchase a product (e.g., an insurance policy or the like). In these instances, the client may be able to purchase one or more types of the product (e.g., life insurance, home insurance, vehicle insurance, or the like).

In one or more instances, in displaying the client onboarding interface, the client device 102 may generate and display a graphical user interface similar to graphical user interface 505, which is shown in FIG. 5. For example, the client device 102 may welcome a client to the onboarding process, and may indicate a method of identity verification. Accordingly, the client may provide user input, using the client device 102, the sensor device 105, or both, to confirm his or her identity.

In one or more instances, in receiving the onboarding verification inputs, the client device 102 and the sensor device 105 may receive one or more of confirmation of a client identification document (e.g., a passport, drivers license, or the like), a fingerprint, a facial signature (e.g., using facial recognition), retina/iris biometrics, a voice signature (e.g., several words or a phrase spoken by a user of the client device 102), a signature based on global positioning system (GPS) data (e.g., a typical trip to work in the morning, a region in which the client device 102 is typically used, or the like), a video/photograph of the user, an international mobile equipment identity (IMEI) number of the client device 102, a usage signature for the client device 102 (e.g., typical call/text patterns or the like), a pulse of the user, a number of phone usages, fitness data, blood pressure data, blood sugar data, activity data, body mass index (BMI) data, body fat data, maximum oxygen consumption data, or the like. In one or more instances, the client device 102 and the sensor device 105 may both receive onboarding verification inputs. In other instances, only one of the client device 102 or the sensor device 105 may receive onboarding verification inputs. In one or more instances, the client device 102 and/or the sensor device 105 may receive the onboarding verification inputs at a single sensor. In other instances, the client device 102 and/or the sensor device 105 may receive the onboarding verification inputs using multiple sensors. For example, the client device 102 and/or the sensor device 105 may detect two different types of personal information from the client (e.g., an image of the client and the client's pulse, an image of the client and blood pressure/sugar, an image of the client and client voice signature, an image of the client and the client fingerprint, or the like).

In one or more instances, while the onboarding verification inputs are being received, microphones on the client device 102 and/or the sensor device 105 may be used to determine if the alleged client is being coached through the onboarding verification input process. Additionally or alternatively, while the onboarding verification inputs are being received, infrared sensors may be used to detect whether the alleged client is alone, or whether additional individuals are present. Both of these techniques may provide information that may be beneficial to the mitigation analysis and output generate platform 103 in its analysis at step 212.

At step 203, the client device 102 and the sensor device 105 may generate and send onboarding verification information (corresponding to the onboarding verification inputs received at step 202) to the onboarding policy management platform 104. In sending the onboarding verification information, the client device 102 and the sensor device 105 may send the onboarding verification information while the first and second wireless data connections, respectively, are established.

At step 204, the onboarding and policy management platform 104 may receive the onboarding verification information sent at step 203. In one or more instances, the onboarding and policy management platform 104 may receive the onboarding verification information via the communication interface 116 and while the first and second wireless data connections are established. In one or more instances, in receiving the onboarding verification information, the onboarding and policy management platform 104 may determine an amount of time elapsed since initiation of the onboarding process.

At step 205, the onboarding and policy management platform 104 may generate and send one or more commands directing the mitigation analysis and output generation platform 103 to analyze the onboarding verification information. In one or more instances, the onboarding and policy management platform 104 may establish a wireless data connection with the mitigation analysis and output generation platform 103. For example, the onboarding and policy management platform 104 may establish a third wireless data connection with the mitigation analysis and output generation platform 103 to link the onboarding and policy management platform 104 to the mitigation analysis and output generation platform 103. In these instances, the onboarding and policy management platform 104 may send the one or more commands directing the mitigation analysis and output generation platform 103 to analyze the onboarding verification information while the third wireless data connection is establish and via the communication interface 116. In one or more instances, the onboarding and policy management platform 104 may send the one or more commands directing the mitigation analysis and output generation platform 103 to analyze the onboarding verification information along with the onboarding verification information.

At step 206, the mitigation analysis and output generation platform may receive the onboarding verification information and the one or more commands directing the mitigation analysis and output generation platform 103 to analyze the onboarding verification information. In one or more instances, the mitigation analysis and output generation platform may receive the onboarding verification information and the one or more commands directing the mitigation analysis and output generation platform 103 to analyze the onboarding verification information via the communication interface 113 while the third wireless data connection is established.

Figure 2B:
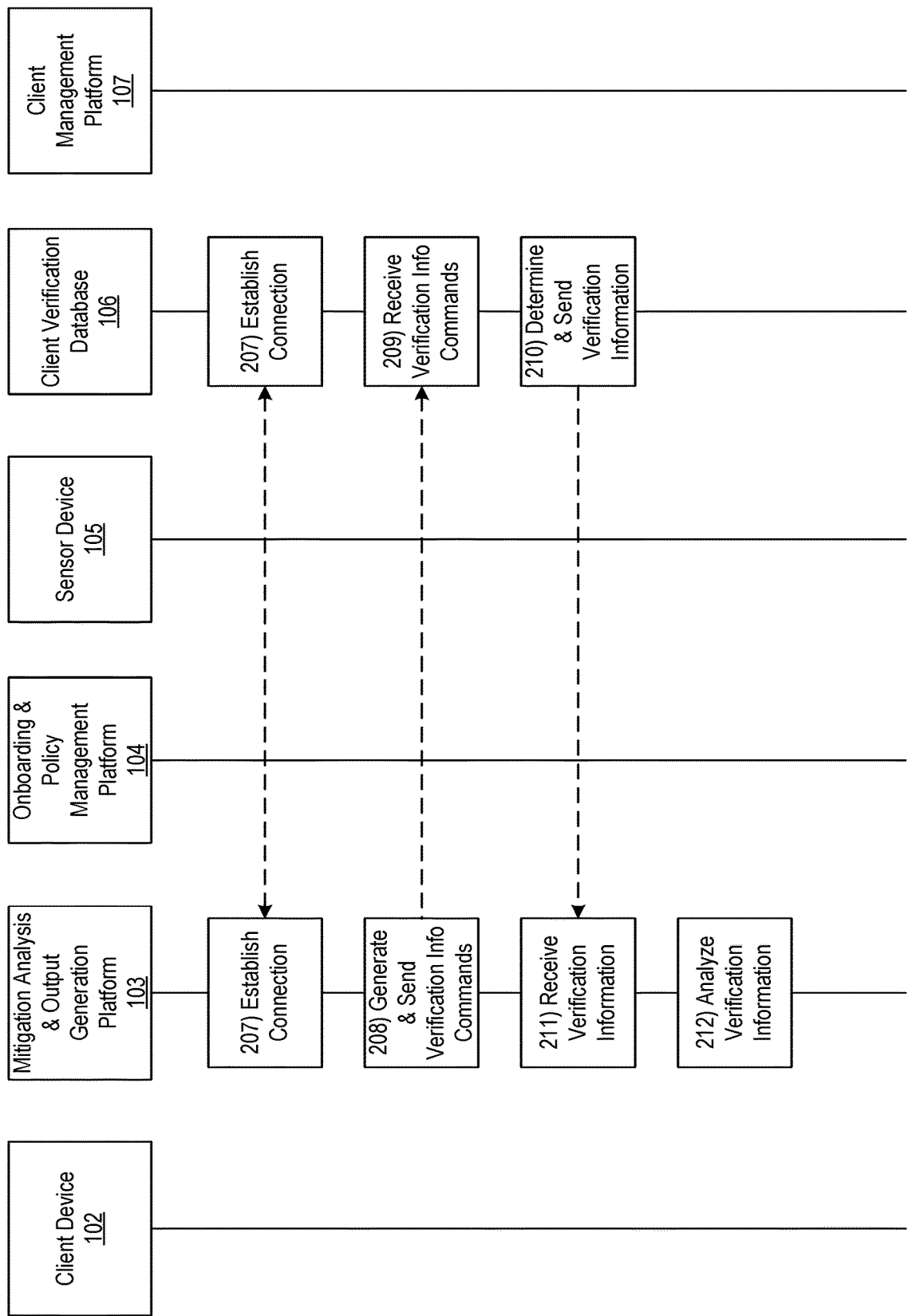

Referring to FIG. 2B, at step 207, the mitigation analysis and output generation platform 103 may establish a connection with the client verification database 106. In one or more instances, the mitigation analysis and output generation platform may establish a fourth wireless data connection with the client verification database 106 to link the mitigation analysis and output generation platform 103 to the client verification database 106.

At step 208, the mitigation analysis and output generation platform 103 may generate one or more commands directing the client verification database 106 to determine client verification information and may send the commands to the client verification database 106. In one or more instances, the mitigation analysis and output generation platform 103 may send the one or more commands directing the client verification database 106 to determine the client verification information via the communication interface 113 and while the fourth wireless data connection is established.

At step 209, the client verification database 106 may receive the one or more commands directing the client verification database 106 to determine the client verification information that were sent at step 208. In one or more instances, the client verification database 106 may receive the one or more commands directing the client verification database 106 to determine the client verification information while the fourth wireless data connection is established.

At step 210, the client verification database 106 may determine client verification information corresponding to the client who allegedly provided the onboarding verification input at step 202. In one or more instances, the client verification database 106 may maintain data corresponding to each client of an institution corresponding to the onboarding and policy management platform 104 (e.g., an insurance institution). The client verification database 106 may maintain a database of client identifiers corresponding to various client devices and sensor devices, and may also maintain stored data previously received from each of these client and sensor devices. Accordingly, the client verification database 106 may maintain data that may be used as a reference point (e.g., compared against the onboarding verification information) to verify that an owner of the client device 102 or sensor device 105 is the one providing the onboarding verification inputs. This may prevent clients from, for example, having a friend or other individual who is healthier (e.g., has a lower resting heart rate, has lower blood pressure, or the like) than the actual user requesting the product or service provide onboarding information such as exercise data, pulse, heartrate, or the like to get a better premium, better discounts, etc. on life insurance. In one or more instances, the client verification database 106 may obtain the client verification information via user input from the clients themselves. Additionally or alternatively, the client verification database 106 may access one or more internal or external databases to obtain the client verification information.

In one or more instances, the client verification database 106 may maintain client identification documents (e.g., a passport, driver's license, or the like), a fingerprint, a social security number, a date of birth, a response/code of a security question, a current home address, an iris/retina scan, a facial signature (e.g., using facial recognition), a voice signature (e.g., several words or a phrase spoken by a user of the client device 102), a signature based on global positioning system (GPS) data (e.g., a typical trip to work in the morning, a region in which the client device 102 is typically used, or the like), a video of the user, an international mobile equipment identity (IMEI) number of the client device 102, a usage signature for the client device 102 (e.g., typical call/text patterns or the like), a number of phone usages, or the like. In one or more instances, the client verification database 106 may maintain social media data (e.g. pictures stored on social media, mined information from social media regarding engagement in risky avocations/aviation (e.g., mountain climbing, vehicle racing, sky diving, scuba diving, aircraft flying, hang gliding, heliskiing, or the like) or the like).

Once the client verification database 106 determines the client verification information corresponding with the alleged client (e.g., by indexing a device identifier of the client device 102 and/or sensor device 105 to determine a user identifier corresponding to the device, and subsequently indexing the user identifier to determine the relevant client verification information), the client verification database 106 may send the relevant client verification information to the mitigation analysis and output generation platform 103. In one or more instances, the client verification database 106 may send the client verification information to the mitigation analysis and output generation platform 103 while the fourth wireless data connection is established.

At step 211, the mitigation analysis and output generation platform 103 may receive the client verification information sent at step 210. In one or more instances, the mitigation analysis and output generation platform 103 may receive the client verification information via the communication interface 113 while the fourth wireless data connection is established.

At step 212, the mitigation analysis and output generation platform 103 may analyze the onboarding verification information received at step 204 by comparing it to the client verification information received at step 211. For example, the mitigation analysis and output generation platform 103 may determine that a received fingerprint does not match a known fingerprint corresponding to the client. In another example, mitigation analysis and output generation platform 103 may determine that GPS data indicates that the client device 102 is located in a country different than client's home country. In yet another example, the mitigation analysis and output generation platform 103 may determine that a different client conducted an onboarding process on the client device 102 within the last week. In yet another example, the mitigation analysis and output generation platform 103 may determine that an amount of time elapsed since initiation of the onboarding process is significantly more that an anticipated amount of time spent to conduct the onboarding process. In one or more instances, the amount of time may be less than a predetermined contestability period. In one or more instances where the onboarding verification information corresponds to a photograph of the client, the mitigation analysis and output generation platform 103 may periodically receive updated photographs throughout the onboarding process, and may compare them to previously received photographs.

In one or more instances where the onboarding verification information corresponds to social media data, the mitigation analysis and output generation platform 103 may generate a facial recognition score for the client based on stored images of the client from the client verification database 106. In these instances, the mitigation analysis and output generation platform 103 may compare the generated facial recognition score to a facial recognition score of a photograph received as an onboarding verification input.

In one or more instances, where the onboarding verification information corresponds to a cell phone carrier or an individual to whom the client device 102 is registered, the mitigation analysis and output generation platform 103 may determine that the onboarding process is being conducted on a phone serviced by a different cell phone carrier than the one that the client uses. In yet another instance, the mitigation analysis and output generation platform 103 may determine that onboarding for the client is being conducted on a device that may belong to another individual.

With regard to fitness data, in one or more instances, the mitigation analysis and output generation platform 103 may receive heart rate data or motion patterns from the client verification database 106. In these instances, the mitigation analysis and output generation platform 103 may compare a heartrate received as an onboarding verification input during an alleged run with heart rate data for the client during various activities. In doing so, the mitigation analysis and output generation platform 103 may determine that the heartrate corresponds to a bike ride, rather than a run (e.g., the client tried to cheat a fitness test during onboarding by riding a bike to move faster rather than running). As another example, the mitigation analysis and output generation platform 103 may determine that the heartrate corresponds to a period of minimal activity, but a movement pattern is detected. Accordingly, the mitigation analysis and output generation platform 103 may determine that the heartrate corresponds to driving a car rather than running (e.g., the client tried to cheat a fitness test during onboarding by slowly driving a car to move faster than running because they may be out of shape).

With regard to movement data, in one or more instances, the mitigation analysis and output generation platform 103 may receive GPS data as to where the client device 102 has been traveling. The mitigation analysis and output generation platform 103 may also receive data from the client verification database 106 corresponding to a time and route of the client's typical commute to work. In these instances, the mitigation analysis and output generation platform 103 may compare the GPS data to the known routes.

Many determinations such as these may be made by the mitigation analysis and output generation platform 103 by comparing onboarding verification information received at the time of onboarding to stored client verification information from the client verification database 106. By comparing the onboarding verification information to the stored client verification information, the mitigation analysis and output generation platform 103 may effectively compare the received onboarding verification inputs to expected onboarding verification inputs. In one or more instances, the mitigation analysis and output generation platform 103 may analyze the onboarding verification information using one or more machine learning algorithms and datasets.

Figure 2C:
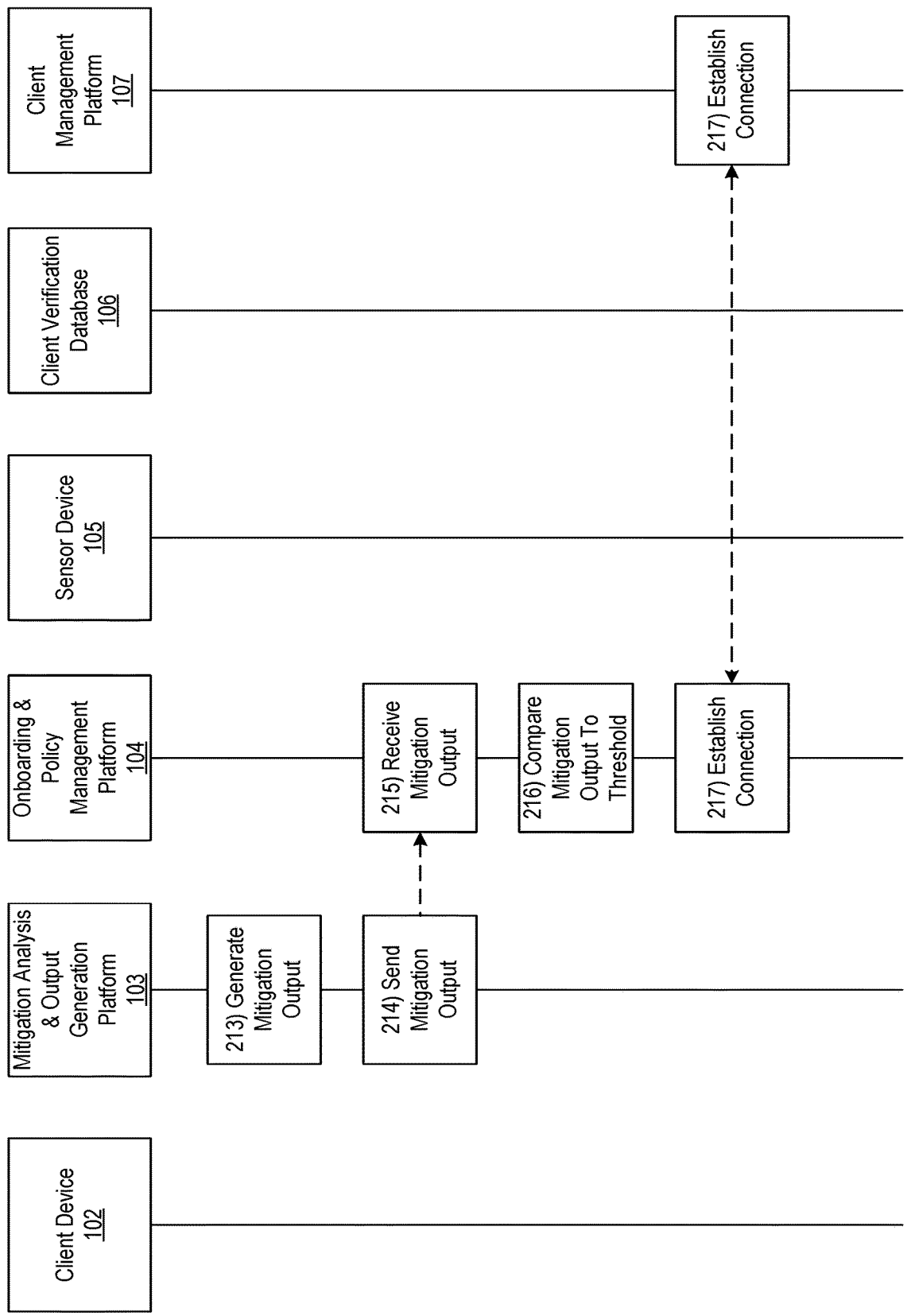

Referring to FIG. 2C, at step 213, the mitigation analysis and output generation platform 103 may generate a mitigation output based on the analysis performed at step 212. In one or more instances, by generating the mitigation output, the mitigation analysis and output generation platform 103 may determine a confidence score corresponding a probability of fraud (e.g., the individual providing the onboarding verification inputs is not who they claim to be). In one or more instances, this confidence score may be on a scale of 0-100, with 100 being the most likely that fraud is being committed.

At step 214, the mitigation analysis and output generation platform 103 may send the mitigation output to the onboarding and policy management platform 104. In one or more instances, the mitigation analysis and output generation platform 103 may send the mitigation output via the communication interface 113 and while the third wireless data connection is established.

At step 215, the onboarding and policy management platform 104 may receive the mitigation output sent at step 214. In one or more instances, the onboarding and policy management platform 104 may receive the mitigation output via the communication interface 116 and while the third wireless data connection is still established.

At step 216, the onboarding and policy management platform 104 may compare the mitigation output received at step 215 to a predetermined mitigation threshold. In one or more instances, the onboarding and policy management platform 104 may determine the predetermined mitigation threshold based on a type of product corresponding to the onboarding process being conducted. For example, a life insurance policy may have a lower predetermined mitigation threshold than a car insurance policy (e.g., easier to a customer to fail the threshold when purchasing a life insurance policy because it may be a more expensive policy than the car insurance policy). In some instances, the predetermined mitigation threshold may depend on the complexity of the product purchased. If the onboarding and policy management platform 104 determines that the mitigation output exceeds the predetermined mitigation threshold, the onboarding and policy management platform 104 may proceed to step 217. Otherwise, the onboarding and policy management platform 104 may proceed to step 225.

At step 217, the onboarding and policy management platform 104 may establish a connection with the client management platform 107. In one or more instances, the onboarding and policy management platform 104 may establish a fifth wireless data connection with the client management platform 107 to link the onboarding and policy management platform 104 with the client management platform 107.

Figure 2D:
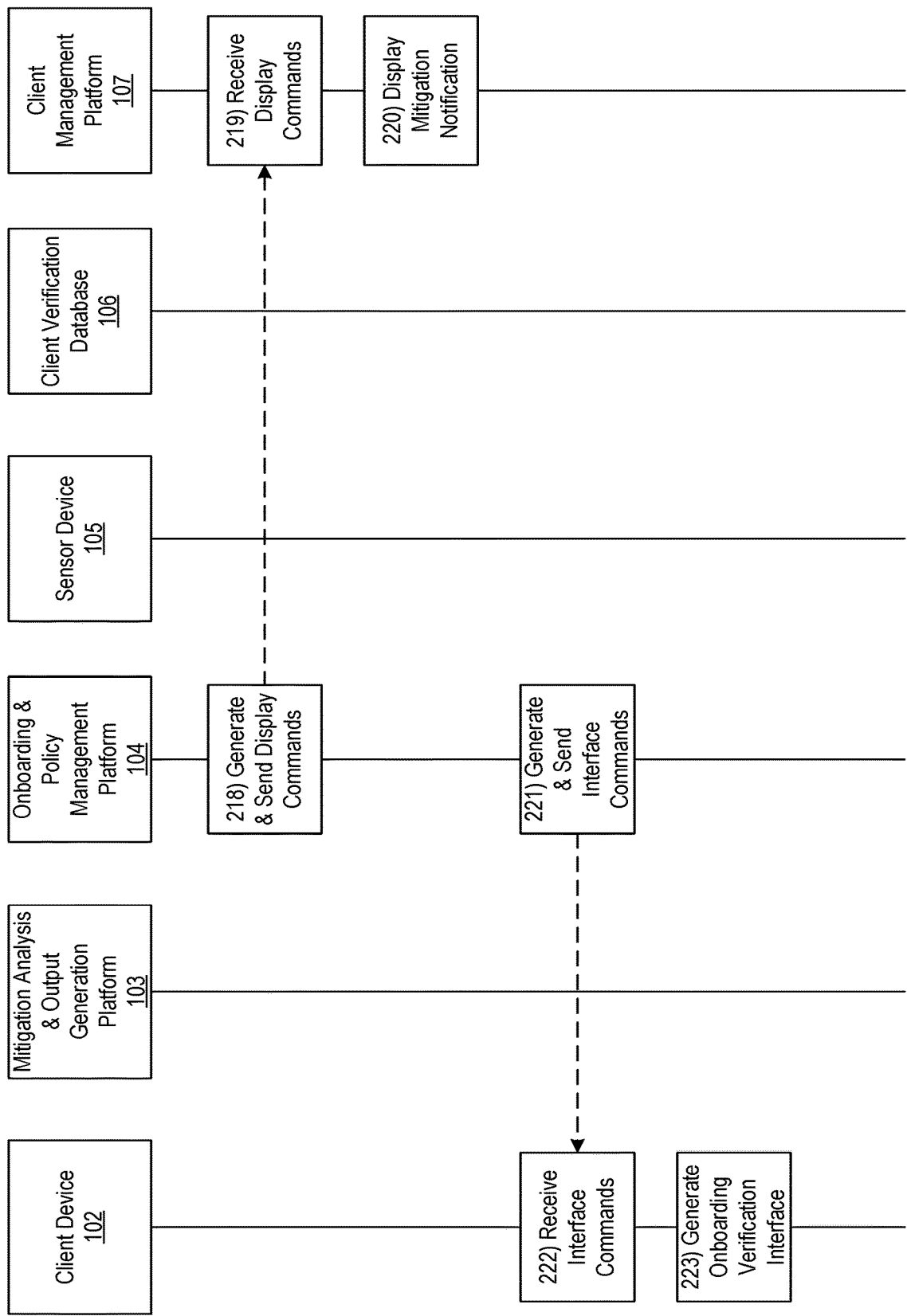

Referring to FIG. 2D, at step 218, the onboarding and policy management platform 104 may generate and send one or more commands directing the client management platform 107 to generate and display a mitigation notification. In one or more instances, the onboarding and policy management platform 104 may send the one or more commands directing the client management platform 107 to generate and display the mitigation notification via the communication interface 116 and while the fifth wireless data connection is established.

At step 219, the client management platform 107 may receive the one or more commands directing the client management platform 107 to generate and display the mitigation notification sent at step 218. In one or more instances, the client management platform 107 may receive the one or more commands directing the client management platform 107 to generate and display the mitigation notification while the fifth wireless data connection is established.

At step 220, the client management platform 107 may display the mitigation notification generated at step 219. In one or more instances, in displaying the mitigation notification, the client management platform 107 may display a graphical user interface similar to graphical user interface 605, which is shown in FIG. 6. For example, the client management platform 107 may display an alert that the client failed the onboarding verification test.

At step 221, the onboarding and policy management platform 104 may generate and send one or more commands directing the client device 102 to generate and display an onboarding verification interface. In one or more instances, the onboarding and policy management platform 104 may send the one or more commands directing the client device 102 to generate and display the onboarding verification interface via the communication interface 116 and while the first wireless data connection is established. In one or more instances, the onboarding and policy management platform 104 may send onboarding verification interface information to the client device 102 along with the commands that the client device 102 may use to generate the onboarding verification interface.

At step 222, the client device 102 may receive the onboarding verification interface information and the one or more commands directing the client device 102 to generate and display the onboarding verification interface sent at step 221. In one or more instances, the client device 102 may receive the onboarding verification interface information and the one or more commands directing the client device 102 to generate and display the onboarding verification interface while the first wireless data connection is established.

At step 223, client device 102 may generate and display an onboarding verification interface using the onboarding verification interface information received at step 222. In displaying the onboarding verification interface, the client device 102 may again display a graphical user interface similar to graphical user interface 505, which is described above. In one or more instances, the client device 102 may prompt the client for the same information received at step 202. Additionally or alternatively, the client device 102 may prompt the client for different information than what was received at step 202. In one or more instances, the client device 102 may prompt for additional onboarding verification inputs to be received via the client device 102, the sensor device 105, or both. In one or more instances, in displaying the onboarding verification interface, the client device 102 may display an indication that an in person interview will be conducted, and may prompt the client to input scheduling information. Additionally or alternatively, the client device 102 may establish a video call session with the client management platform 107. For example, a client may be prompted to move the client device 102 around and in particular angles. Accordingly, the client device may collect photographs of the client or of the background, and this information may be further analyzed as described below.

Figure 2E:
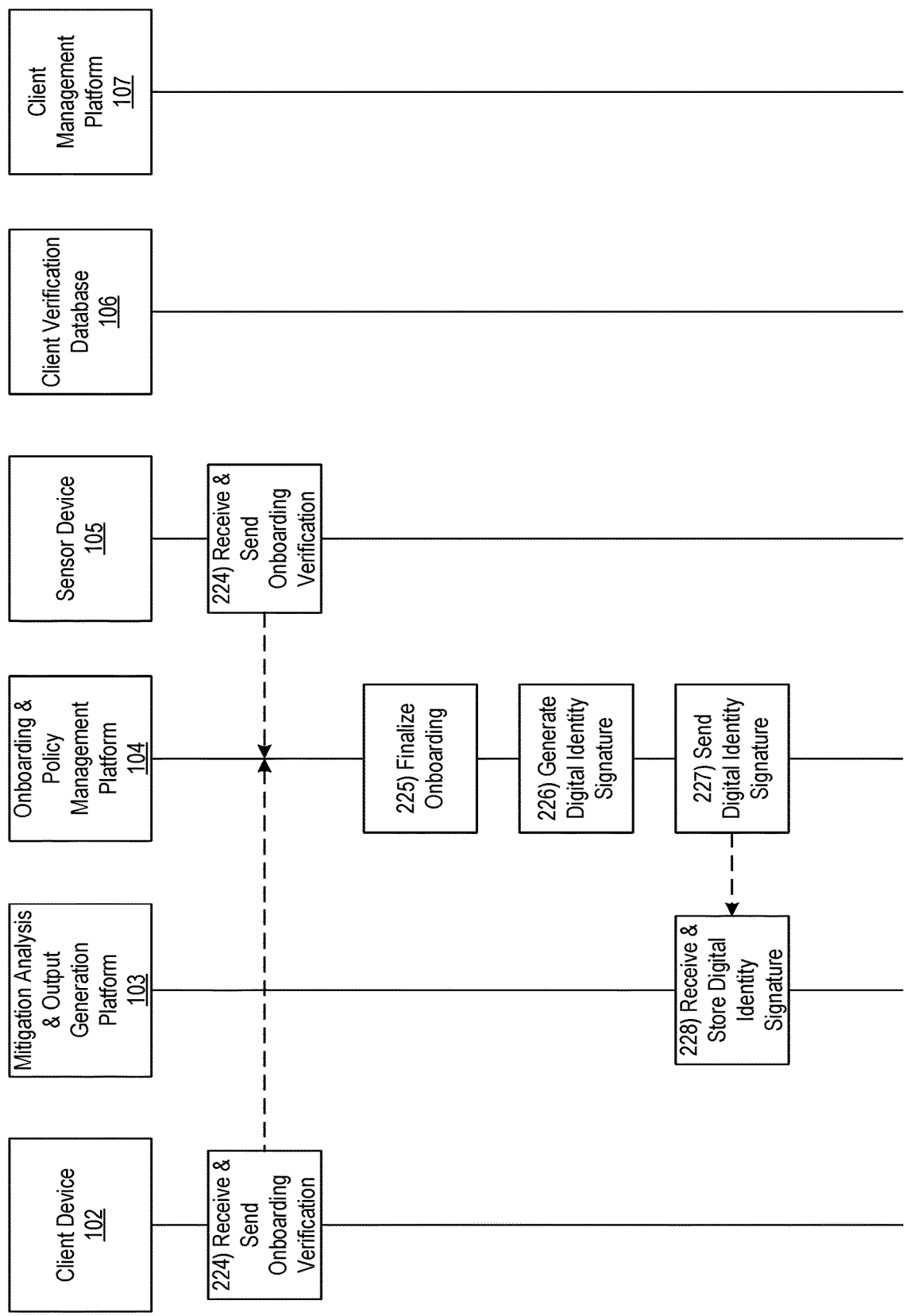

Referring to FIG. 2E, at step 224, the client device 102 and/or the sensor device 105 may receive additional onboarding verification inputs. In receiving the additional onboarding verification inputs, the client device 102 and/or the sensor device 105 may receive one or more of confirmation of a client identification document (e.g., a passport, driver's license, or the like), a fingerprint, a facial signature (e.g., using facial recognition), a voice signature (e.g., several words or a phrase spoken by a user of the client device 102), a signature based on global positioning system (GPS) data (e.g., a typical trip to work in the morning, a region in which the client device 102 is typically used, or the like), a video/photograph of the user, an international mobile equipment identity (IMEI) number of the client device 102, a usage signature for the client device 102 (e.g., typical call/text patterns or the like), a client's pulse, a number of phone usages, photographs, air sensor data, ambient noise data, heart rate data, acceleration data, pressure change data, a movement signature, additional health information, fitness data, blood pressure data, blood sugar data, activity data, body mass index (BMI) data, body fat data, maximum oxygen consumption data, or the like. In one or more instances, once the additional onboarding verification inputs are received, the event sequence may return to step 203 to initiate analysis of the additional onboarding verification inputs. It should be understood that similar information may be received and similar techniques may be used at step 224 as is described above at step 202. Once the additional onboarding verification inputs are received, the client device 102 and the sensor device 105 may send them to the onboarding and policy management platform 104.

At step 225, the onboarding and policy management platform 104 may finalize the onboarding process. In one or more instances, by finalizing the onboarding process, the onboarding and policy management platform 104 may cause purchase of one or more products (e.g., insurance products/policies provided by an insurance institution). In one or more instances, in finalizing the onboarding process, the onboarding and policy management platform 104 may generate and send a notification to the client device 102 that may inform a client that spot check authentication may be periodically performed going forward to confirm the client identity. In some instances, the onboarding and policy management platform 104 may send a notification that the client may be prompted for the same information, as provided during onboarding, once again in 24 hours to verify the client's identity. In other instances, the onboarding and policy management platform 104 might not inform the client device 102 of the spot check authentication.

At step 226, the onboarding and policy management platform 104 may generate a digital identity signature. In one or more instances, in generating the digital identity signature, the onboarding and policy management platform 104 may generate an authentication key that may be used to initially authenticate a client with regards to the onboarding process or related verification tests. In one or more instances, the onboarding and policy management platform 104 may generate the digital identity signature based on previously received onboarding verification inputs that the onboarding and policy management platform 104 deemed to correspond accurately to the client. Additionally or alternatively, the onboarding and policy management platform 104 may generate the digital identity signature based on client verification information stored at the client verification database 106 that corresponds to the client. Additionally or alternatively, the onboarding and policy management platform 104 may direct the client device 102 to prompt the user for the digital identity signature (e.g., "Please record words or numbers that may be used to verify your identity going forward," or the like). This may be similar to prompting a user to establish a user name and password that may be used for future authentication. Additionally, this may allow the onboarding and policy management platform 104 to verify that the client is a living individual rather than an automated robot. Additionally or alternatively, patterns of heart rate rise and fall over the course of a particular activity may be used as the digital identity signature. In yet another example, pressure sensors in the client's running shoes may be used to establish the digital identity signature. Accordingly, it should be understood that the digital identity signature may be any data/information or combination thereof that may be used to initially authenticate the client for further interactions.

Additionally or alternatively, the onboarding and policy management platform 104 may generate the digital identity signature by generating one or more questions that only the client knows the answer to. For example, the onboarding and policy management platform 104 may access data stored at the client verification database 106 corresponding to internal database information (e.g., vehicle color, house color, additional vehicle information, square footage of house, or the like) and may generate the one or more questions based on this information. For example, the digital identity signature may correspond to the internal database information, and the client may later be prompted to input this internal database information in response to the one or more questions (e.g., show an image of three vehicles and the user has to pick the right one, or the like). Additionally or alternatively, the onboarding and policy management platform 104 may access data stored at the client verification database 106 corresponding to external database information (e.g., social media information or the like) and may generate the one or more questions based on this information. For example, the digital identity signature may correspond to answers about a recent trip to Hawaii the client took (e.g., it may be determined that the client was in Hawaii based on their social media posts). Additionally or alternatively, the onboarding and policy management platform 104 may determine, based on GPS data, a popular destination of the client (e.g., a school, a business, a coffee shop, a grocery store close to the house, or the like), and may generate the one or more questions based on this information.

At step 227, the onboarding and policy management platform 103 may send the digital identity signature determined at step 226 to the mitigation analysis and output generation platform 103. In one or more instances, the onboarding and policy management platform 104 may send the digital identity signature to the mitigation analysis and output generation platform via the communication interface 116 and while the third wireless data connection is established. Additionally or alternatively, the onboarding and policy management platform 103 may send the digital identity signature to the client verification database 106.

At step 228, the mitigation analysis and output generation platform 103 may receive and store the digital identity signature sent at step 227. In one or more instances, the mitigation analysis and output generation platform 103 may receive the digital identity signature via the communication interface 113 and while the third wireless data connection is established. Alternatively, the client verification database 106 may receive and store the digital identity signature, and the mitigation analysis and output generation platform 103 may retrieve the digital identity signature from the client verification database 106.

Figure 2F:
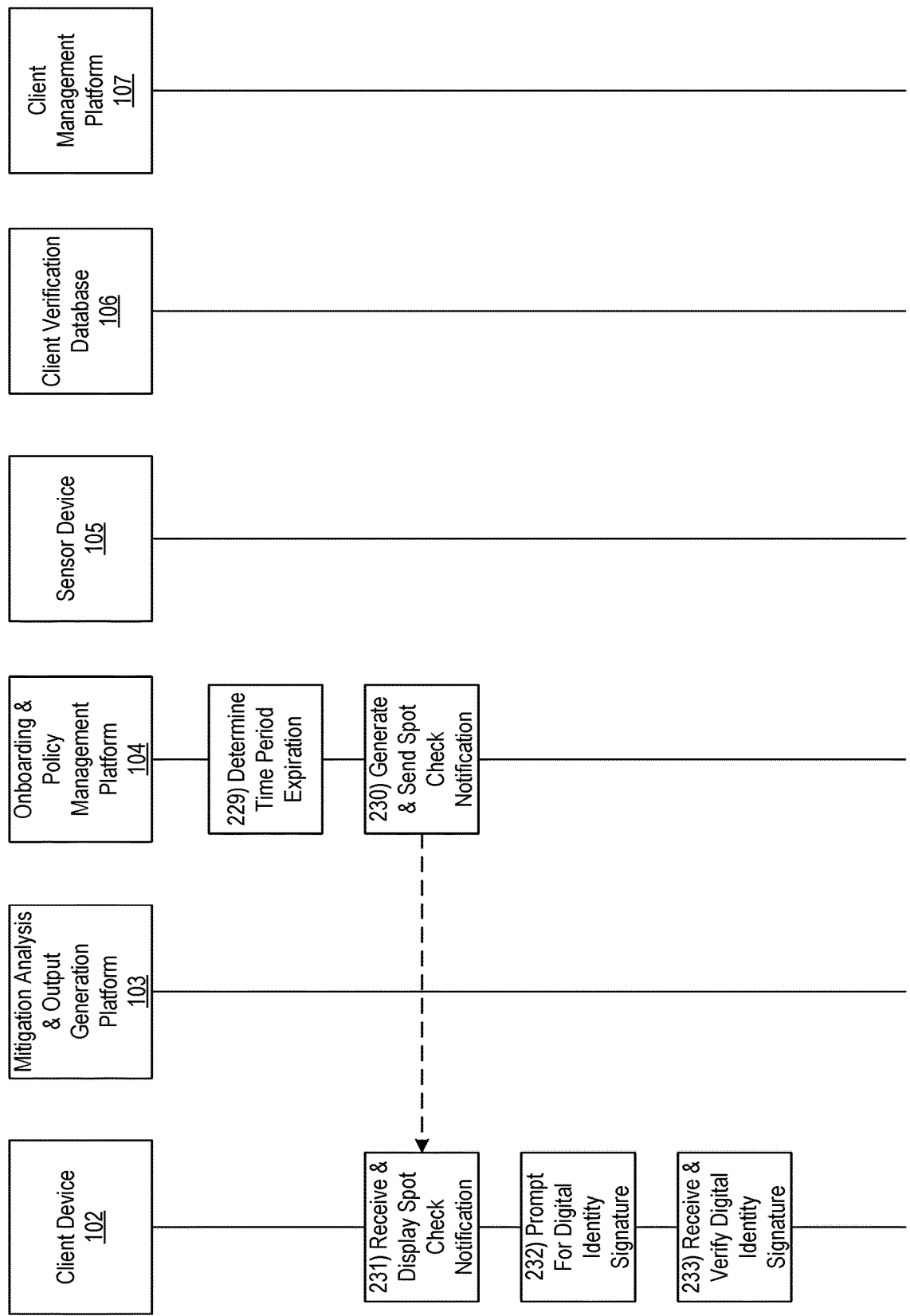

Referring to FIG. 2F, at step 229, the onboarding and policy management platform 104 may determine that a predetermined time period has expired since completion of the onboarding process at step 225. In one or more instances, the predetermined time period may be determined based on a type of product purchased during the onboarding process. In one or more instances, the predetermined time period may be randomly generated. In one or more instances, in determining the expiration of the time period, the onboarding and policy management platform 104 may compare an elapsed time since onboarding completion to a predetermined time threshold. In one or more instances, the predetermined time period may be less than a contestability period (e.g., two years).

At step 230, the onboarding and policy management platform 104 may generate and send a spot check notification to the client device 102 based on the determination of the time period expiration at step 229. For example, the onboarding and policy management platform 104 may inform the client device 102 that further verification testing may be performed to verify client identity. In some instances, the client might not be aware of the potential for this further verification testing and/or might not be aware of when the testing will occur (e.g., this spot check verification testing may be a surprise to the client). In one or more instances, the onboarding and policy management platform 104 may send the spot check notification via the communication interface 116 and while the first wireless data connection is established. In one or more instances, in addition to the spot check notification, the onboarding and policy management platform 104 may generate and send one or more commands directing the client device 102 to display the spot check verification notification. In addition to or instead of the spot check notification, a voice call session may be established between the client device 102 and the client management platform 107 during which an employee corresponding to the client management platform 107 may inform a client of the spot check verification testing to be performed.

At step 231, the client device 102 may receive and display the spot check notification sent at step 230. In one or more instances, the client device 102 may receive the spot check notification while the first wireless data connection is established. In one or more instances, in addition to the spot check notification, the client device 102 may receive one or more commands directing the client device 102 to display the spot check verification notification. In one or more instances, in displaying the spot check notification, the client device 102 may display a graphical user interface similar to graphical user interface 705, which is displayed in FIG. 7. For example, the graphical user interface 705 may indicate to a client that a spot check identity test will be performed, and may prompt the client to accept. In one or more instances, a temporary hold may be placed on the client's account until they accept/complete the spot check identity test. In one or more instances, the "accept" button may corresponding to a link to the spot check identity test.

At step 232, the client device 102 may prompt for the digital identity signature generated at step 226. In prompting for the digital identity signature, the client device 102 may prompt a client for an initial authentication measure.

At step 233, the client device 102 may receive and verify the digital identity signature. In one or more instances, the client device 102 may communicate with the mitigation analysis and output generation platform 103 to compare the received digital identity signature to the stored digital identity signature. In one or more instances, the client device 102 may retrieve the stored digital identity signature from the mitigation analysis and output generation platform 103 or the client verification database 106. If the client device 102 determines that the digital identity signature exceeds a predetermined correlation threshold with the stored digital identity signature, the client device 102 may proceed. Otherwise, the client device 102 may prompt the client to re-enter the digital identity signature. In one or more instances, the client device 102 may verify the digital identity signature using one or more machine learning algorithms.

Figure 2G:
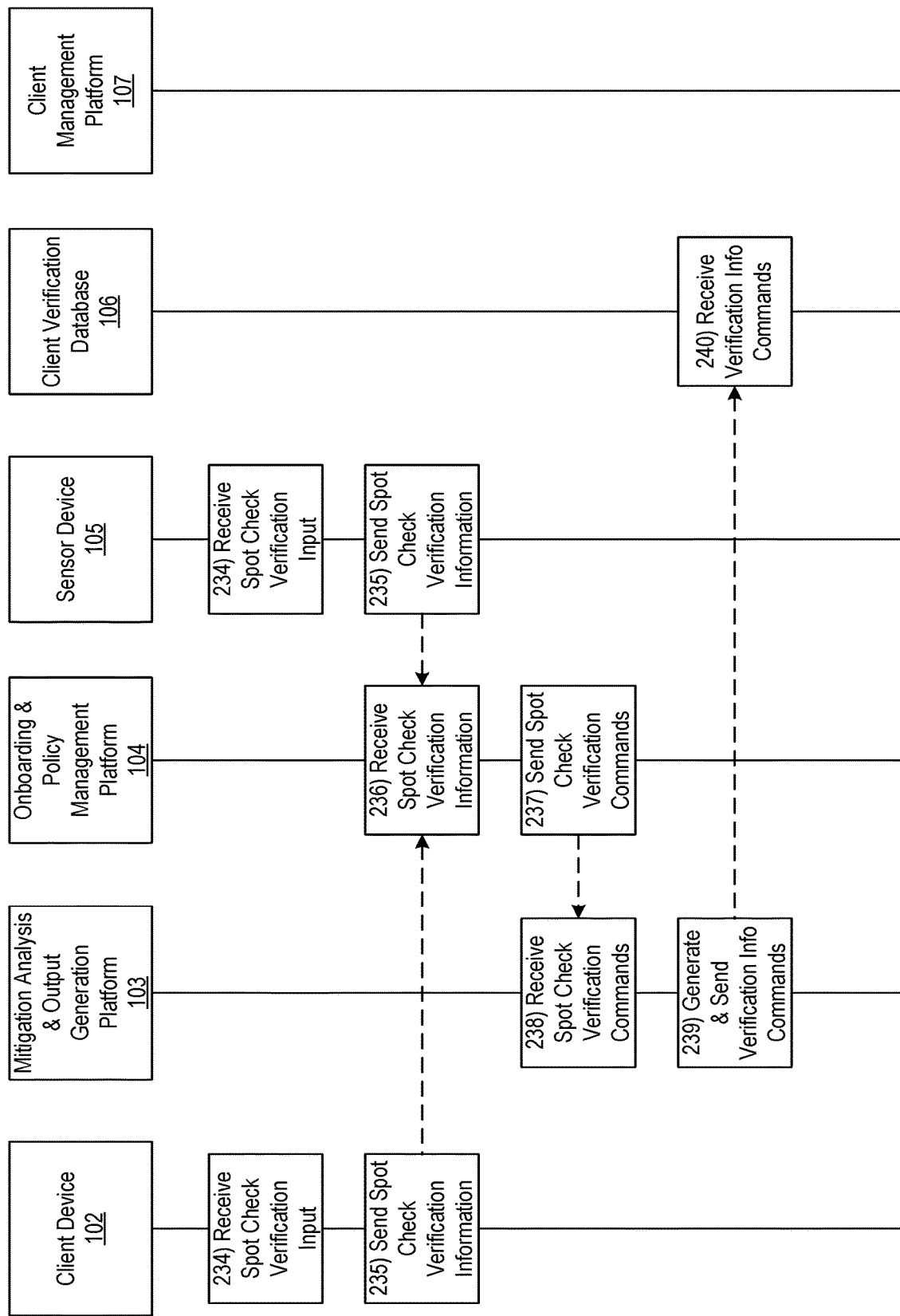

Referring to FIG. 2G, at step 234, once the digital identity signature has been received and verified, the client device 102 and/or the sensor device 105 may prompt for and receive a spot check verification input. In receiving the spot check verification input, the client device 102 and/or the sensor device 105 may receive information indicative of a user identity. In one or more instances, in receiving the spot check verification input, the client device 102 may receive one or more of a pulse, a voice signature, a motion signature, (e.g., walking, running, or the like), a fingerprint, a code response, or the like. Additionally or alternatively, the client device 102 and/or the sensor device 105 may receive any of the other pieces of information described above with regard to the onboarding verification inputs at step 202 and may employ any similar techniques as described above (e.g., microphone/infrared detection or the like). In one or more instances, the client device 102 may indicate what spot check verification input should be received. In one or more instances, the client device 102 may prompt for a particular type of spot check verification input based on known sensor devices corresponding to the client. For example, if the client has a fitness tracker band, the client device 102 may be more likely to prompt for a motion signature. Additionally or alternatively, the client device 102 may establish a video call session with the client management platform 107, and the spot check verification inputs may be received while the video call session is established. For example, a client may be prompted to move the client device 102 around and in particular angles. Accordingly, the client device 102 may collect photographs of the client or of the background, and this information may be further analyzed as described below.

Although the spot check verification process is described herein following the onboarding process, it should be understood that in some instances, spot check verification may be performed significantly after or without the onboarding process (e.g., for existing customers). In these instances, spot check verification may be performed regardless whether or not the initial onboarding process occurs.

At step 235, the client device 102 and/or the sensor device 105 may send spot check verification information, based on the spot check verification inputs received at step 234, to the onboarding and policy management platform 104. In one or more instances, the client device 102 and the sensor device 105 may send the spot check verification information while the first and second wireless data connections, respectively, are established. In one or more instances, the spot check verification information may be similar to the information described above with regard to step 224. Additionally, or alternatively, the spot check verification information may include an amount of time elapsed during the onboarding process.

At step 236, the onboarding and policy management platform 104 may receive the spot check verification information sent at step 235. In one or more instances, the onboarding and policy management platform 104 may receive the spot check verification information via the communication interface 116 and while the first and second wireless data connections are established.

At step 237, the onboarding and policy management platform 104 may generate and send one or more spot check verification commands directing the mitigation analysis and output generation platform 103 to analyze the spot check verification information received at step 236. In one or more instances, the onboarding and policy management platform 104 may send the spot check verification information along with the spot check verification commands. In one or more instances, the onboarding and policy management platform 104 may send the one or more spot check verification commands directing the mitigation analysis and output generation platform 103 to analyze the spot check verification information via the communication interface 116 and while the third wireless data connection is established.

At step 238, the mitigation analysis and output generation platform 103 may receive the one or more spot check verification commands directing the mitigation analysis and output generation platform 103 to analyze the spot check verification information. In one or more instances, the mitigation analysis and output generation platform 103 may receive the one or more spot check verification commands directing the mitigation analysis and output generation platform 103 to analyze the spot check verification information via the communication interface 113 and while the third wireless data connection is established. In these instances, the mitigation analysis and output generation platform 103 may receive commands to compare the spot check verification information to stored client verification information that corresponds to anticipated values for the spot check verification information.

At step 239, the mitigation analysis and output generation platform 103 may generate and send one or more commands directing the client verification database 106 to determine and send client verification information corresponding to the client. In one or more instances, the mitigation analysis and output generation platform 103 may send the one or more commands directing the client verification database 106 to determine and send client verification information corresponding to the client via the communication interface 113 and while the fourth wireless data connection is established. In one or more instances, the mitigation analysis and output generation platform 103 may send a device identifier corresponding to the client device 102 along with the commands.

At step 240, the client verification database 106 may receive the one or more commands directing the client verification database 106 to determine and send client verification information corresponding to the client. In one or more instances, the client verification database 106 may receive the one or more commands directing the client verification database 106 to determine and send client verification information corresponding to the client while the fourth wireless data connection is established.

Figure 2H:
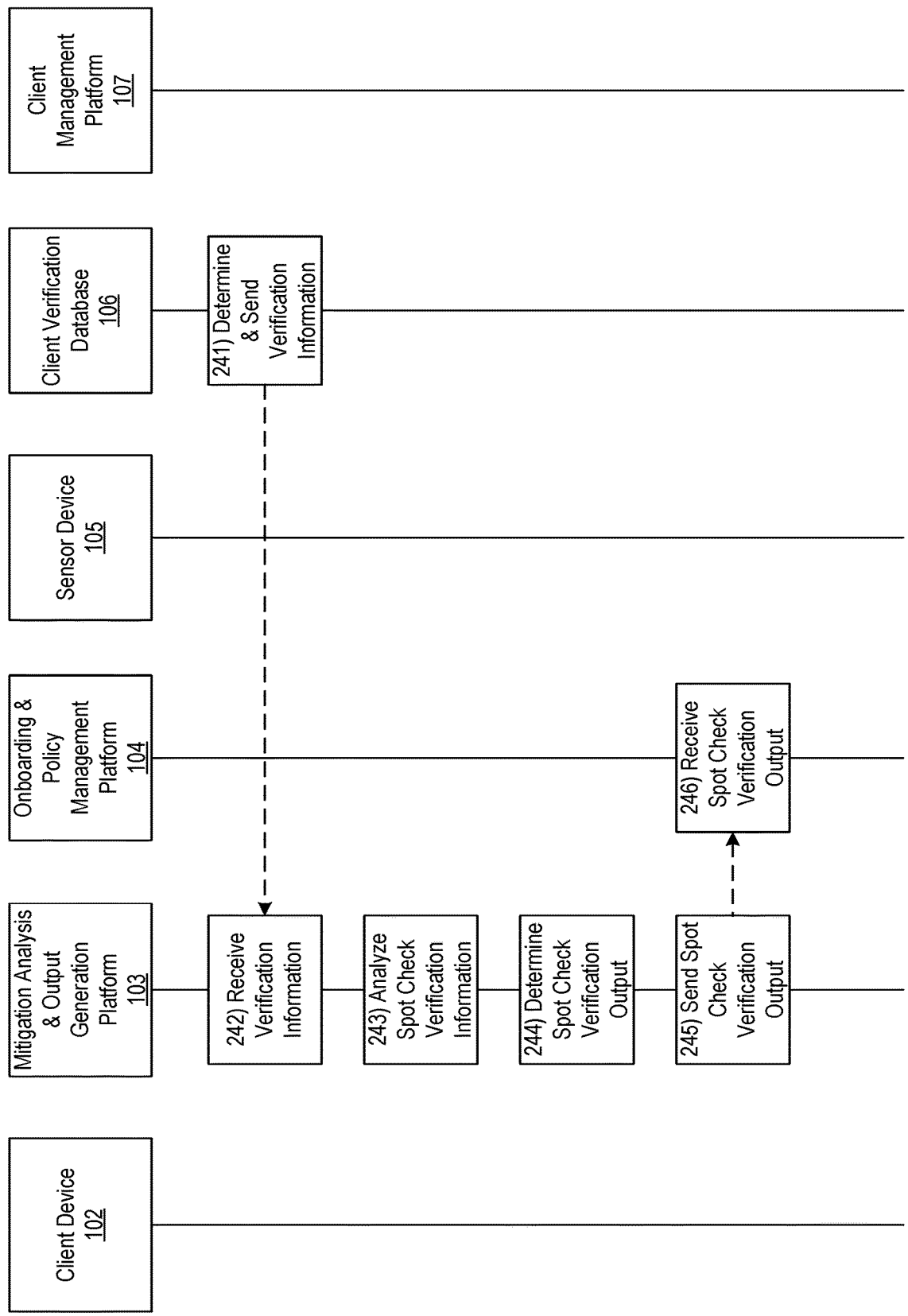

Referring to FIG. 2H, at step 241, the client verification database 106 may determine and send client verification information corresponding to the client. In one or more instances, the client verification database 106 may determine the relevant client verification information in a similar manner to that described above with regard to step 210. In one or more instances, the client verification database 106 may send the client verification information corresponding to the client while the fourth wireless data connection is established.

At step 242, the mitigation analysis and output generation platform 103 may receive the client verification information from the client verification database 106. In one or more instances, the mitigation analysis and output generation platform 103 may receive the client verification information via the communication interface 113 and while the fourth wireless data connection is established.

At step 243, the mitigation analysis and output generation platform 103 may analyze the spot check verification information. In one or more instances, the mitigation analysis and output generation platform 103 may compare the spot check verification information to the client verification information. The analysis performed by the mitigation analysis and output generation platform 103 at step 243 may be similar to the analysis performed at step 212 with regard to the onboarding verification information. In one or more instances, the mitigation analysis and output generation platform 103 may determine a correlation between the amount of time elapsed during the onboarding process and an anticipated amount of time to complete the onboarding process. In these instances, the anticipated amount of time may be based on the particular product type of the product purchased during the onboarding, as identified above as step 202. In one or more instances, the mitigation analysis and output generation platform 103 may analyze the spot check verification information using one or more machine learning algorithms and datasets. In one or more instances, the mitigation analysis and output generation platform 103 may compare the spot check verification information to the onboarding verification information received at step 204. It should be understood that analysis of the spot check verification information at step 243 may be similar to the analysis of the onboarding verification information at step 212.

At step 244, based on the analysis performed at step 243, the mitigation analysis and output generation platform 103 may generate a spot check verification output to quantify a correlation between the spot check verification information and the client verification information. In one or more instances, in determining the spot check verification output, the mitigation analysis and output generation platform 103 may generate a score between 0 and 100 with 100 being the highest likelihood of a fraud event a 0 being the lowest likelihood of a fraud event. Accordingly, in generating the spot check verification output, the mitigation analysis and output generation platform 103 may generate an indication of a correlation between the received spot check verification inputs and expected spot check verification inputs. Similarly, in generating the spot check verification output, the mitigation analysis and output generation platform 103 may generate a likelihood that mitigation techniques should be used.

At step 245, the mitigation analysis and output generation platform 103 may send the spot check verification output, determined at step 244, to the onboarding and policy management platform 104. In one or more instances, the mitigation analysis and output generation platform 103 may send the spot check verification output to the onboarding and policy management platform 104 via the communication interface 113 and while the third wireless data connection is established.

At step 246, the onboarding and policy management platform 104 may receive the spot check verification output sent at step 245. In one or more instances, the onboarding and policy management platform 104 may receive the spot check verification output via the communication interface 116 and while the fourth wireless data connection is still established.

Figure 2I:
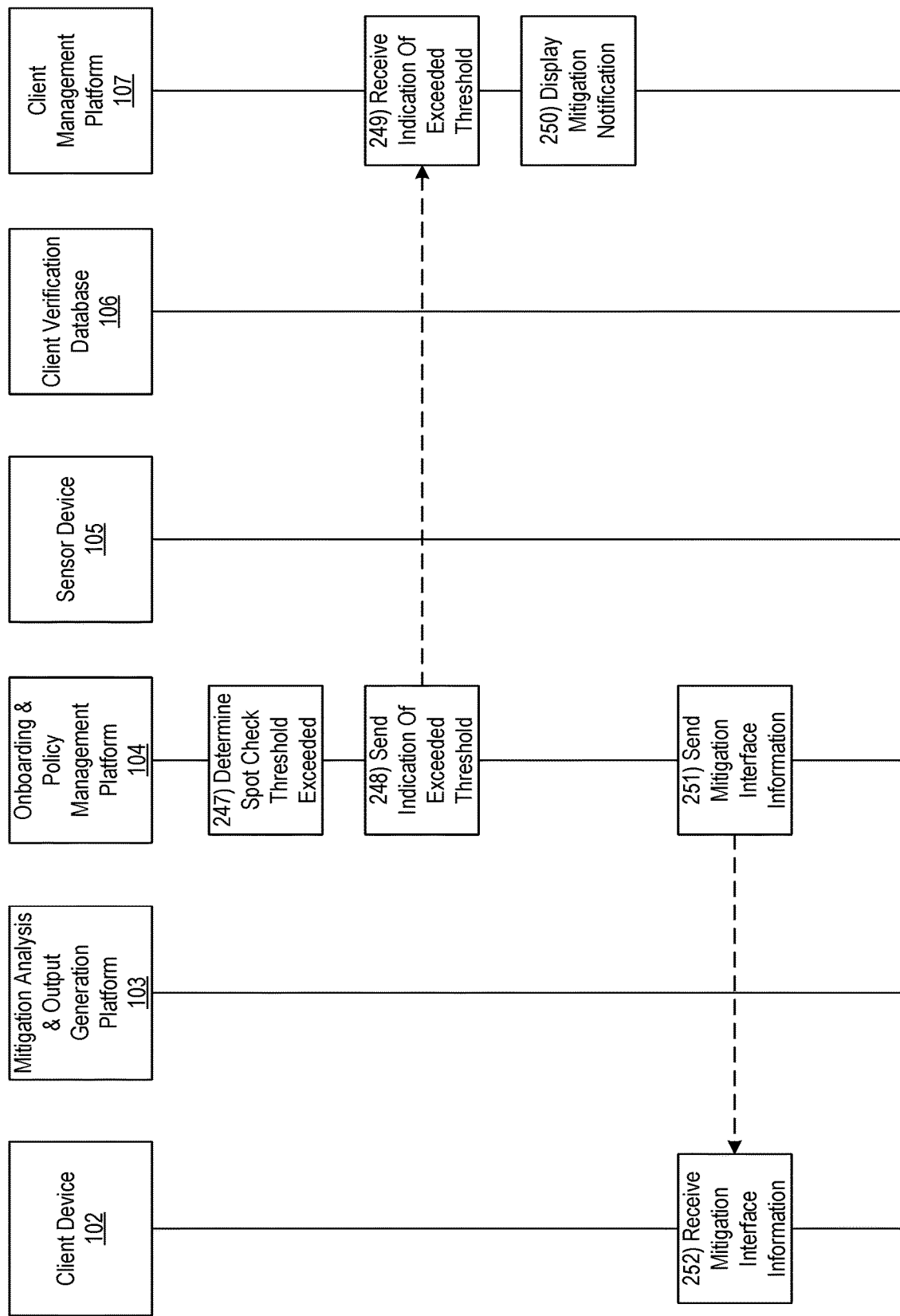

Referring to FIG. 2I, at step 247, the onboarding and policy management platform 104 may determine whether the spot check verification output exceeds a predetermined spot check threshold. In one or more instances, the onboarding and policy management platform 104 may determine the predetermined spot check threshold based on a type of the product purchased during the onboarding process. For example, the onboarding and policy management platform 104 may impose a higher level of security on certain purchases than on others. In one or more instances, the predetermined spot check threshold may correspond to the predetermined mitigation threshold described above at step 216. In other instances, the predetermined spot check threshold may be different than the predetermined mitigation threshold. If the onboarding and policy management platform 104 determines that the spot check verification output does not exceed the predetermined spot check threshold, the client identity may be verified and the event sequence may end. If the onboarding and policy management platform 104 determines that the spot check verification output does exceed the predetermined spot check threshold, the onboarding and policy management platform 104 may proceed to step 248.

At step 248, the onboarding and policy management platform 104 may generate and send an indication of the exceeded spot check threshold. In one or more instances, the onboarding and policy management platform 104 may send the indication of the exceeded spot check threshold to the client management platform 107 via the communication interface 1165 and while the fifth wireless data connection is established. In one or more instances, the onboarding policy management platform 104 may also generate one or more commands directing the client management platform 107 to display a mitigation notification based on the indication of the exceeded spot check threshold, and may send the one or more commands to the client management platform 107 along with the indication of the exceeded spot check threshold.

At step 249, the client management platform 107 may receive the indication of the exceeded spot check threshold and the one or more commands directing the client management platform 107 to display the mitigation notification based on the indication of the exceeded spot check threshold. In one or more instances, the client management platform 107 may receive the indication of the exceeded spot check threshold and the one or more commands while the fifth wireless data connection is established.

At step 250, the client management platform 107 may display the mitigation notification. In one or more instances, in displaying the mitigation notification, the client management platform 107 may display a graphical user interface similar to graphical user interface 805, which is shown in FIG. 8. For example, the client management platform 107 may display an indication that the client failed the spot check identity verification test, and may prompt for user input on whether the product corresponding to the onboarding process should be cancelled (e.g., cancel the policy, or the like), or whether the client should be prompted for additional spot check verification inputs. In one or more instances, if the client management platform 107 receives a user input indicating that the product should be cancelled, the client management platform 107 may send an indication to the onboarding and policy management platform 104 that the purchase of the product should be voided.

At step 251, based on the determination at step 247 that the spot check threshold was exceeded, the onboarding and policy management platform 104 may generate and send mitigation interface information to the client device 102 along with one or more commands directing the client device 102 to generate and display a spot check verification interface. In one or more instances, the onboarding and policy management platform 104 may send the mitigation interface information and the one or more commands directing the client device 102 to generate and display the spot check verification interface via the communication interface 116 and while the first wireless data connection is established.

At step 252, the client device 102 may receive the mitigation interface information and the one or more commands directing the client device 102 to generate and display the spot check verification interface. In one or more instances, the client device 102 may receive the mitigation interface information and the one or more commands directing the client device 102 to generate and display the spot check verification interface while the first wireless data connection is established.

Referring to FIG. 2J, at step 253, the client device 102 may generate and display the spot check verification interface based on the mitigation interface information received at step 252. In generating the spot check verification interface, the client device 102 may generate and display an interface that prompts the client for additional spot check verification inputs. In one or more instances, in displaying the spot check verification interface, the client device 102 may display an indication that an in person interview will be conducted, and may prompt the client to input scheduling information.

Additionally or alternatively, the client device 102 may display an indication that an in person test to obtain the spot check verification inputs may be conducted. For example, if blood pressure data was received at step 234, the client device 102 may display an indication that an in person blood pressure test should be conducted within a predetermined period of time (e.g., 2 weeks). In this example, the client device 102 may provide options of one or more facilities at which the testing may be performed (e.g., minute clinics, doctors, or the like). In some examples, the client device 102 may display an indication that additional in person testing should be conducted, but might not provide an indication of the type of testing (e.g., may keep this as a surprise to the client to reduce the client's ability to cheat on the testing).

Additionally or alternatively, the client device 102 may establish a video call session with the client management platform 107. For example, a client may be prompted to move the client device 102 around and in particular angles. Accordingly, the client device may collect photographs of the client or of the background, and this information may be further analyzed as described above.

At step 254, the client device 102 and/or the sensor device 105 may receive the additional spot check verification inputs. Once the additional spot check verification inputs are received, the event sequence may return to step 235 to initiate analysis of the additional spot check verification inputs. In one or more instances, the additional spot check verification inputs may be similar to the information received at steps 202, 224, and/or 234, which are described above.

Once the additional spot check verification inputs are verified, the example event sequence may end, and the mitigation analysis and output generation platform 103 and onboarding and policy management platform 104 may continue to analyze the authenticity of clients during and after an onboarding process is conducted. By operating in this way, these computing platforms may increase security associated with the onboarding process and may allow individuals and entities who manage the onboarding process to more effectively mitigate fraud by ensuring that an individual providing the client identification inputs during the onboarding process is the individual who they purport to be (e.g., they are not using a surrogate individual to perform the tests, such as an out of shape parent who has their athlete child perform fitness tests during onboarding to obtain better coverage and/or rates).

Figure 3:
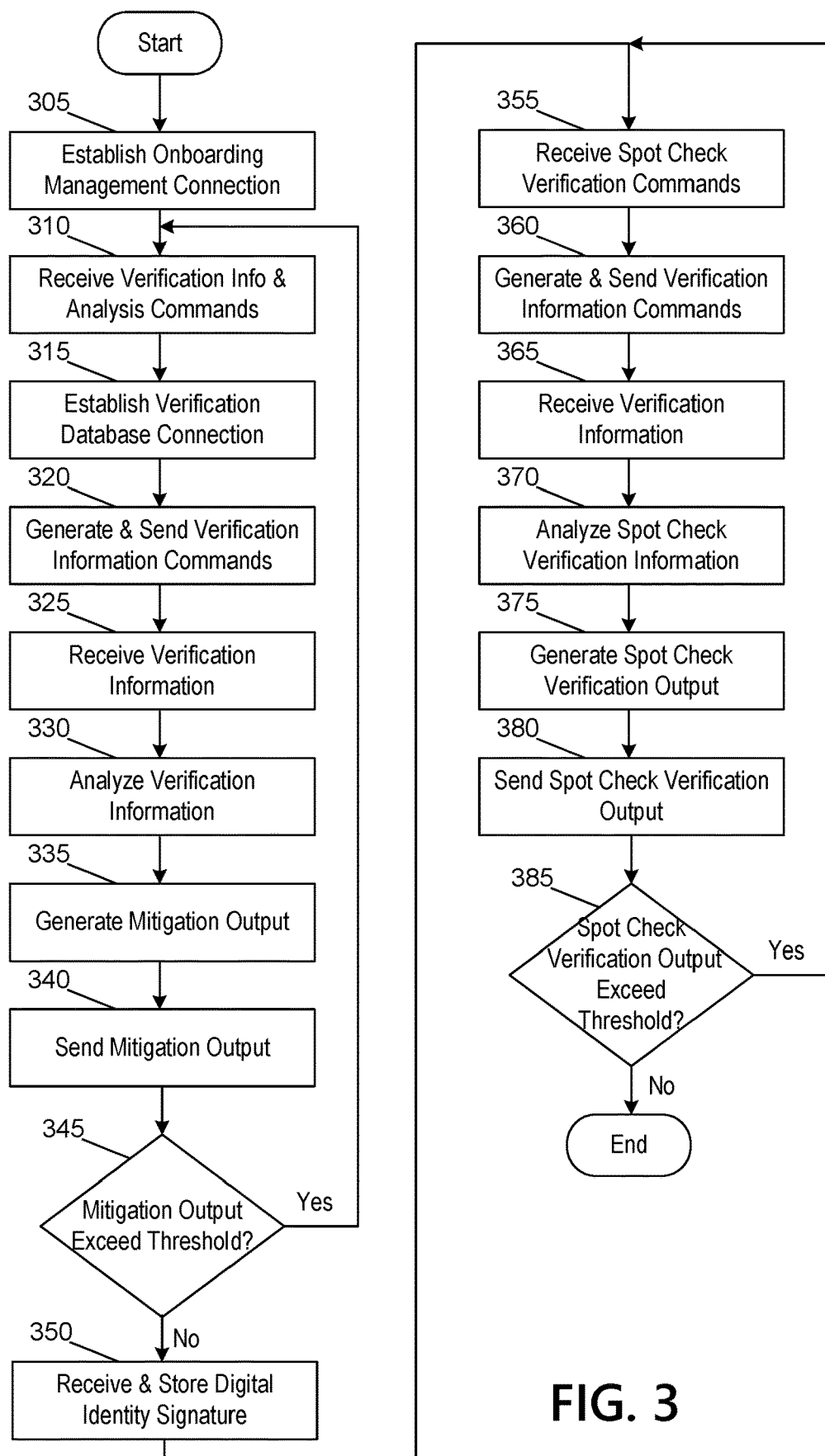
FIGS. 3 and 4 depict illustrative methods for deploying computing platforms that utilize improved mitigation analysis and policy management techniques in accordance with one or more example arrangements discussed herein.

FIG. 3 depicts an illustrative method for deploying a mitigation analysis and output generation platform 103 that utilizes improved techniques to analyze onboarding and spot check verification information in accordance with one or more example embodiments. Referring to FIG. 3, at step 305, a computing platform may establish a connection with an onboarding and policy management computing platform. At step 310, the computing platform may receive onboarding verification information and one or more commands directing the computing platform to analyze the onboarding verification information. At step 315, the computing platform may establish a connection with a client verification database. At step 320, the computing platform may generate and send one or more commands directing the client verification database to provide client verification information. At step 325, the computing platform may receive the client verification information. At step 330, the computing platform may analyze the client verification information. At step 335, the computing platform may generate a mitigation output based on the analysis. At step 340, the computing platform may send the mitigation output to the onboarding and policy management computing platform. At step 345, if the computing platform generated a mitigation output that exceeds a predetermined mitigation threshold, the computing platform may return to step 310. If the computing platform generated a mitigation output that did not exceed the predetermined mitigation threshold, the computing platform may proceed to step 350.

At step 350, the computing platform may receive and store a digital identity signature. At step 355, the computing platform may receive one or more commands directing the computing platform to perform verification of one or more spot check verification inputs. At step 360, the computing platform may generate and send one or more commands directing the client verification database to provide client verification information. At step 365, the computing platform may receive the client verification information. At step 370, the computing platform may analyze the spot check verification information by comparing it to the client verification information. At step 375, the computing platform may generate a spot check verification output based on the analysis. At step 380, the computing platform may send the spot check verification output to the onboarding and policy management computing platform. At step 380, if the computing platform generated a spot check verification output that exceeded a predetermined threshold, the computing platform may return to step 355. If the computing platform generated a spot check verification output that did not exceed the predetermined threshold, the method may end.

Figure 4:
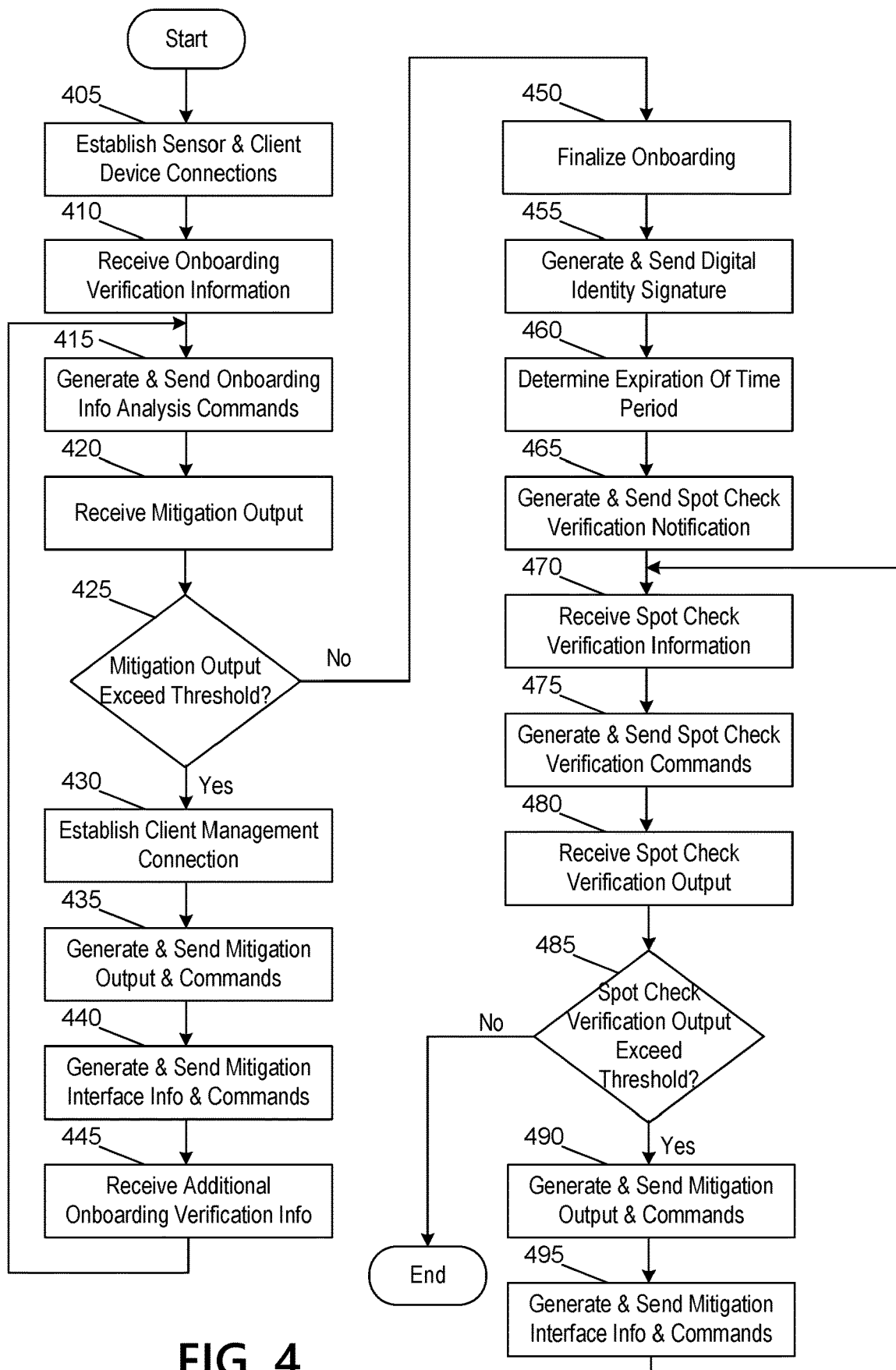

FIG. 4 depicts an illustrative method for deploying an onboarding and policy management platform 104 that utilizes improved techniques to manage onboarding processes and established policies in accordance with one or more example embodiments. Referring to FIG. 4, at step 405, the computing platform may establish a connection to a client device and a sensor device. At step 410, the computing platform may receive onboarding verification from the sensor device and/or the client device. At step 415, the computing platform may establish a connection with a mitigation analysis and output generation platform and may generate and send one or more commands directing the mitigation analysis and output generation platform to analyze the onboarding verification information. At step 420, the computing platform may receive a mitigation output based on the analysis. At step 425, the computing platform may determine whether the mitigation output exceeds a predetermined threshold. If the mitigation output does not exceed the threshold, the computing platform may proceed to step 450. If the mitigation output does exceed the threshold, the computing platform may proceed to step 430.

At step 430, the computing platform may establish a connection with a client management platform. At step 435, the computing platform may generate and send one or more commands directing the client management platform to display the mitigation output. At step 440, the computing platform may generate and send mitigation interface information and one or more commands directing the client device to display a mitigation interface. At step 445, the computing platform may receive additional onboarding verification information, and may return to step 415.

At step 450, the computing platform may finalize the onboarding process. At step 455, the computing platform may generate and send a digital identity signature to the mitigation analysis and output generation platform. At step 460, the computing platform may determine that a predetermined period of time since completion of the onboarding has elapsed. At step 465, the computing platform may generate and send a spot check verification notification to the client device. At step 470, the computing platform may receive spot check verification information. At step 475, the computing platform may generate and send one or more commands directing the mitigation analysis and output generation platform to analyze the spot check verification information. At step 480, the computing platform may receive a spot check verification output. At step 485, the computing platform may determine whether the spot check verification output exceeds a predetermined threshold. If the spot check verification output does not exceed the predetermined threshold, the method may end. If the spot check verification output does exceed the predetermined threshold, the computing platform may proceed to step 490.

At step 490, the computing platform may generate and send one or more commands for the client management platform to display the mitigation output. At step 495, the computing platform may generate and send mitigation interface information, and one or more commands directing the client device to display a mitigation interface based on the mitigation interface information. The computing platform may then return to step 470 to receive additional spot check verification information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
a memory that stores data associated with a plurality of products, a plurality of product types and information corresponding to one or more users in a database, wherein for each of the one or more users, the information comprises a user identifier, and a device identifier of a mobile device, wherein each of the plurality of product types comprises a mitigation threshold;
at least one processor; and
a communication interface communicatively coupled to the at least one processor; and
wherein the memory further comprises computer-readable instructions that, when executed by the at least one processor, cause the at least one processor to perform steps of:
    determining that a period of time has elapsed since finalizing an onboarding process of a product of the plurality of products from a user of the one or more users, wherein the product is previously purchased by the user during the onboarding process;
    determining the device identifier of the mobile device associated with the user by querying the database;
    establishing, via the communication interface, one or more wireless data connections with the mobile device of the user and with a sensor device of the user;
    sending, to the mobile device of the user and in response to determining that the period of time has elapsed since finalizing the onboarding process, a spot check verification notification and one or more commands to display the spot check verification notification;
    receiving, from the mobile device and the sensor device of the user, one or more first spot check verification inputs comprising information corresponding to an identity of the user;
    sending, to a mitigation analysis and output generation platform, the received one or more first spot check verification inputs;
    receiving, from the mitigation analysis and output generation platform, a spot check verification output, wherein the spot check verification output comprises a degree of correlation between the one or more received first spot check verification inputs and expected spot check verification inputs;
    determining a product type of the product by querying the database;
    determining a mitigation threshold based on the product type of the product by querying the database;
    in response to determining that the spot check verification output exceeds the mitigation threshold, sending one or more commands to display a mitigation notification interface prompting for user input to void purchase of the product previously purchased during the onboarding process or conduct an additional verification test;
    in response to receiving the user input to conduct an additional verification test, sending, to the mobile device, one or more commands to display a spot check verification interface prompting for one or more second spot check verification inputs corresponding to the identity of the user;
    receiving, from the mobile device, the one or more second spot check verification inputs;
    validating the identity of the user based on the one or more second spot check verification inputs; and
    sending a confirmation of the identity of the user for the product in response to the validation.

2. The computing platform of claim 1, wherein the memory stores additional computer-readable instructions that, when executed by the at least one processor, further cause the at least one processor to perform steps of:
    determining an amount of time during the onboarding process; and
    in response to determining that a correlation between the amount of time elapsed during the onboarding process and an expected onboarding process time does not exceed a predetermined onboarding time correlation threshold, voiding purchase of the product corresponding the onboarding process.

3. The computing platform of claim 2, wherein the onboarding process corresponds to a process for purchasing the product, and wherein the product corresponds to a particular product type.

4. The computing platform of claim 3, wherein the memory stores additional computer-readable instructions that, when executed by the at least one processor, further cause the at least one processor to perform a step of:
    determining the expected onboarding process time based on the product type of the product.

5. The computing platform of claim 1, wherein the one or more spot check verification inputs match one or more onboarding verification inputs received during the onboarding process.

6. The computing platform of claim 1, wherein the one or more spot check verification inputs comprise one or more of a pulse, a voice signature, a retinal/iris scan, a motion signature, a fingerprint, a code response, global positioning system (GPS) data, a photograph, air sensor data, ambient noise data, a heart rate, acceleration data, or a pressure change.

7. The computing platform of claim 6, wherein the one or more spot check verification inputs are received while a video conference session is established between the mobile device and a client management platform.

8. The computing platform of claim 1, wherein the memory stores additional computer-readable instructions that, when executed by the at least one processor, further cause the at least one processor to perform a step of:
    sending, prior to sending the spot check verification notification and the one or more commands to display the spot check verification notification, a digital identity signature.

9. A method using a computing platform comprising at least one processor, a communication interface communicatively coupled to the at least one processor and a memory, the method comprising:
    storing, by the computing platform in a database in the memory, data associated with a plurality of products, a plurality of product types and information corresponding to one or more users in a database, wherein for each of the one or more users, the information comprises a user identifier, and a device identifier of a mobile device, wherein each of the plurality of product types comprises a mitigation threshold;
    determining, by the computing platform, that a period of time has elapsed since finalizing an onboarding process of a product of the plurality of products from a user of the one or more users, wherein the product is previously purchased by the user during the onboarding process;

determining, by the computing platform, the device identifier of the mobile device associated with the user by querying the database;
establishing, via the communication interface, one or more wireless data connections with the mobile device of the user and with a sensor device of the user;
sending, by the computing platform to the mobile device of the user and in response to determining that the period of time has elapsed since finalizing the onboarding process, a spot check verification notification and one or more commands to display the spot check verification notification;
receiving, by the computing platform from the mobile device and the sensor device of the user, one or more first spot check verification inputs comprising information corresponding to an identity of the user;
sending, by the computing platform to a mitigation analysis and output generation platform, the received one or more first spot check verification inputs;
receiving, by the computing platform, from the mitigation analysis and output generation platform, a spot check verification output, wherein the spot check verification output comprises a degree of correlation between the one or more received first spot check verification inputs and expected spot check verification inputs;
determining, by the computing platform, a product type of the product;
determining, by the computing platform, determine a mitigation threshold based on the product type of the product by querying the database;
in response to determining that the spot check verification output exceeds the mitigation threshold, sending, by the computing platform, one or more commands to display a mitigation notification interface prompting for user input to void purchase of the product previously purchased during the onboarding process or conduct an additional verification test;
in response to receiving the user input to conduct an additional verification test, sending, by the computing platform to the mobile device, one or more commands to display a spot check verification interface prompting for one or more second spot check verification inputs corresponding to the identity of the user;
receiving, by the computing platform from the mobile device, the one or more second spot check verification inputs;
validating, by the computing platform, the identity of the user based on the one or more second spot check verification inputs; and
sending, by the computing platform, a confirmation of the identity of the user for the product in response to the validation.

10. The method of claim 9, further comprising:
determining, by the computing platform, an amount of time during the onboarding process; and in response to determining that a correlation between the amount of time elapsed during the onboarding process and an expected onboarding process time does not exceed a predetermined onboarding time correlation threshold, voiding purchase of the product corresponding the onboarding process.

11. The method of claim 10, wherein the onboarding process corresponds to a process for purchasing the product and wherein the product corresponds to a particular product type.

12. The method of claim 11, further comprising:
determining, by the computing platform, the particular product type; and
determining, by the computing platform, the expected onboarding process time based on the particular product type of the product.

13. The method of claim 9, wherein the one or more spot check verification inputs match one or more onboarding verification inputs received during the onboarding process.

14. The method of claim 9, wherein the one or more spot check verification inputs comprise one or more of a pulse, a voice signature, a motion signature, a fingerprint, a code response, global positioning system (GPS) data, a retinal/iris scan, a photograph, air sensor data, ambient noise data, a heart rate, acceleration data, or a pressure change.

15. The method of claim 9, further comprising:
sending, by the computing platform, prior to sending the spot check verification notification and the one or more commands to display the spot check verification notification, a verified digital identity signature.

16. One or more non-transitory computer-readable media storing instructions, that, when executed by at least one processor of a computing platform, wherein the computing platform further comprises a communication interface communicatively coupled to the at least one processor, and a memory, cause the at least one processor to perform steps of:
storing, in a database in the memory, data associated with a plurality of products, a plurality of product types and information corresponding to one or more users in a database, wherein for each of the one or more users, the information comprises a user identifier, and a device identifier of a mobile device, wherein each of the plurality of product types comprises a mitigation threshold;
determining that a period of time has elapsed since finalizing an onboarding process of a product of the plurality of products from a user of the one or more users, wherein the product is previously purchased by the user during the onboarding process;
determining the device identifier of the mobile device associated with the user by querying the database;
establishing, via the communication interface, one or more wireless data connections with the mobile device of the user and with a sensor device of the user;
sending, to the mobile device of the user and in response to determining that the period of time has elapsed since finalizing the onboarding process, a spot check verification notification and one or more commands to display the spot check verification notification;
receiving, from the mobile device and the sensor device of the user, one or more first spot check verification inputs comprising information corresponding to an identity of the user;
sending, to a mitigation analysis and output generation platform, the received one or more first spot check verification inputs;
receiving, from the mitigation analysis and output generation platform, a spot check verification output, wherein the spot check verification output comprises a degree of correlation between the one or more received first spot check verification inputs and expected spot check verification inputs;
determining a product type of the product by querying the database;
determining a mitigation threshold based on the product type of the product by querying the database;

in response to determining that the spot check verification output exceeds the mitigation threshold, sending one or more commands to display a mitigation notification interface prompting for user input to void purchase of the product previously purchased during the onboarding process or conduct an additional verification test;

in response to receiving the user input to conduct an additional verification test, sending, to the mobile device, one or more commands to display a spot check verification interface prompting for one or more second spot check verification inputs corresponding to the identity of the user;

receiving, from the mobile device, the one or more second spot check verification inputs;

validating the identity of the user based on the one or more second spot check verification inputs; and sending a confirmation of the identity of the user for the product in response to the validation.

17. The one or more non-transitory computer-readable media of claim 16, wherein the memory stores additional computer-readable instructions that, when executed by the at least one processor, further cause the at least one processor to perform steps of:

determining an amount of time during the onboarding process; and in response to determining that a correlation between the amount of time elapsed during the onboarding process and an expected onboarding process time does not exceed a predetermined onboarding time correlation threshold, voiding purchase of the product corresponding the onboarding process.

18. The one or more non-transitory computer-readable media of claim 16, wherein the onboarding process corresponds to a process for purchasing the product and wherein the product corresponds to a particular product type.

19. The one or more non-transitory computer-readable media of claim 18, wherein the memory stores additional computer-readable instructions that, when executed by the at least one processor, further cause the at least one processor to perform a step of:

determining the expected onboarding process time based on the particular product type of the product.

20. The computing platform of claim 1, wherein the memory stores additional computer-readable instructions that, when executed by the at least one processor, further cause the at least one processor to perform a step of:

determining that the period of time based on the product type of the product.

* * * * *